United States Patent
Hassan

(10) Patent No.: US 12,531,528 B2
(45) Date of Patent: Jan. 20, 2026

(54) ANTENNA TUNER

(71) Applicant: QUALCOMM Incorporated, San Diego, CA (US)

(72) Inventor: Muhammad Hassan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 273 days.

(21) Appl. No.: 18/189,561

(22) Filed: Mar. 24, 2023

(65) Prior Publication Data

US 2024/0322768 A1    Sep. 26, 2024

(51) Int. Cl.
| | | |
|---|---|---|
| *H01Q 1/50* | (2006.01) | |
| *H03F 1/56* | (2006.01) | |
| *H03F 3/19* | (2006.01) | |
| *H03F 3/24* | (2006.01) | |

(52) U.S. Cl.
CPC ............. *H03F 3/245* (2013.01); *H03F 1/565* (2013.01); *H03F 2200/294* (2013.01); *H03F 2200/387* (2013.01); *H03F 2200/451* (2013.01)

(58) Field of Classification Search
CPC ... H03F 1/56; H03F 1/565; H03F 3/24; H03F 3/245; H03H 7/09; H03H 7/38; H04B 1/04; H04B 1/0458
See application file for complete search history.

(56) References Cited

U.S. PATENT DOCUMENTS

| | | | | |
|---|---|---|---|---|
| 6,697,030 B2 * | 2/2004 | Gleener | ............... | H01Q 9/14 343/745 |
| 6,765,540 B2 * | 7/2004 | Toncich | ............... | H01P 1/213 343/860 |
| 9,680,218 B2 * | 6/2017 | Katz | ............... | H01Q 7/005 |
| 9,853,614 B2 * | 12/2017 | Wang | ............... | H03F 3/3022 |
| 10,468,179 B2 | 11/2019 | Mika | | |
| 10,574,196 B2 * | 2/2020 | Chen | ............... | H04B 1/0458 |
| 11,095,265 B2 * | 8/2021 | Akiyama | ............... | H03H 7/38 |
| 11,533,075 B1 | 12/2022 | Yu et al. | | |
| 11,742,819 B1 * | 8/2023 | Wright | ............... | H03F 3/45 333/24 R |
| 12,028,098 B2 * | 7/2024 | Lin | ............... | H04B 1/0475 |
| 2011/0163824 A1 | 7/2011 | Kawano | | |
| 2019/0013789 A1 | 1/2019 | Mori | | |
| 2020/0028536 A1 | 1/2020 | Liu | | |
| 2020/0266792 A1 | 8/2020 | Bagga | | |
| 2021/0119596 A1 | 4/2021 | Yu et al. | | |
| 2022/0021353 A1 | 1/2022 | Han et al. | | |

OTHER PUBLICATIONS

Partial International Search Report—PCT/US2024/015616—ISA/EPO—Jun. 14, 2024.
International Search Report and Written Opinion—PCT/US2024/015616—ISA/EPO—Jul. 18, 2024.

* cited by examiner

*Primary Examiner* — Tho G Phan
(74) *Attorney, Agent, or Firm* — Loza & Loza LLP

(57) ABSTRACT

An apparatus includes a power amplifier, a first inductor coupled to the power amplifier, a second inductor magnetically coupled with the first inductor, and an impedance matching circuit having a first terminal and a second terminal, wherein the first terminal is coupled to the second inductor, and the second terminal is coupled to an antenna port. The impedance matching circuit includes a third inductor coupled between the first terminal and the second terminal, wherein the third inductor overlaps the first inductor and the second inductor, and one or more capacitors coupled to the third inductor.

16 Claims, 17 Drawing Sheets

ANTENNA TUNER

BACKGROUND

Field

Aspects of the present disclosure relate generally to wireless communications, and, more particularly, to impedance matching in a wireless device.

Background

A wireless device may include a transceiver for transmitting and/or receiving signals via one or more antennas. It is desirable to provide good impedance matching between the transceiver and the one/or more antennas to facilitate efficient transfer of power between the transceiver and the one/or more antennas.

SUMMARY

The following presents a simplified summary of one or more implementations in order to provide a basic understanding of such implementations. This summary is not an extensive overview of all contemplated implementations and is intended to neither identify key or critical elements of all implementations nor delineate the scope of any or all implementations. Its sole purpose is to present some concepts of one or more implementations in a simplified form as a prelude to the more detailed description that is presented later.

A first aspect relates to an apparatus. The apparatus includes a power amplifier, a first inductor coupled to the power amplifier, a second inductor magnetically coupled with the first inductor, and an impedance matching circuit having a first terminal and a second terminal, wherein the first terminal is coupled to the second inductor, and the second terminal is coupled to an antenna port. The impedance matching circuit includes a third inductor coupled between the first terminal and the second terminal, wherein the third inductor overlaps the first inductor and the second inductor, and one or more capacitors coupled to the third inductor.

A second aspect relates to an apparatus. The apparatus includes a power amplifier, a low-noise amplifier, a first inductor coupled to the power amplifier, a second inductor magnetically coupled with the first inductor, and a third inductor coupled to the low-noise amplifier, wherein the third inductor is magnetically coupled with the second inductor. The apparatus also includes an impedance matching circuit having a first terminal and a second terminal, wherein the first terminal is coupled to the second inductor, and the second terminal is coupled to an antenna port. The impedance matching circuit includes a fourth inductor coupled between the first terminal and the second terminal, and one or more capacitors coupled to the fourth inductor.

A third aspect relates to a method for antenna tuning. The method includes magnetically coupling a radio frequency (RF) signal from a first inductor to a second inductor, and tuning an impedance of an antenna seen at the second inductor using an impedance matching circuit, the impedance matching circuit including a third inductor overlapping the first inductor and the second inductor, and one or more capacitors coupled to the third inductor. The method also includes propagating the RF signal from the impedance matching circuit to the antenna.

A fourth aspect relates to an apparatus. The apparatus includes a power amplifier, a first inductor coupled to the power amplifier, a second inductor magnetically coupled with the first inductor, and an impedance matching circuit having a first terminal and a second terminal, wherein the first terminal is coupled to the second inductor, and the second terminal is coupled to an antenna port. The impedance matching circuit includes a third inductor magnetically coupled to the first inductor and the second inductor and coupled between the first terminal and the second terminal, and one or more capacitors coupled to the third inductor.

A fifth aspect relates to an apparatus for antenna tuning. The apparatus includes means for magnetically coupling a radio frequency (RF) signal from a first inductor to a second inductor, and means for tuning an impedance of an antenna seen at the second inductor, the means for tuning the antenna impedance including a third inductor overlapping the first inductor and the second inductor. The method also includes means for propagating the RF signal from the means for tuning the antenna impedance to the antenna.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Figure 1:
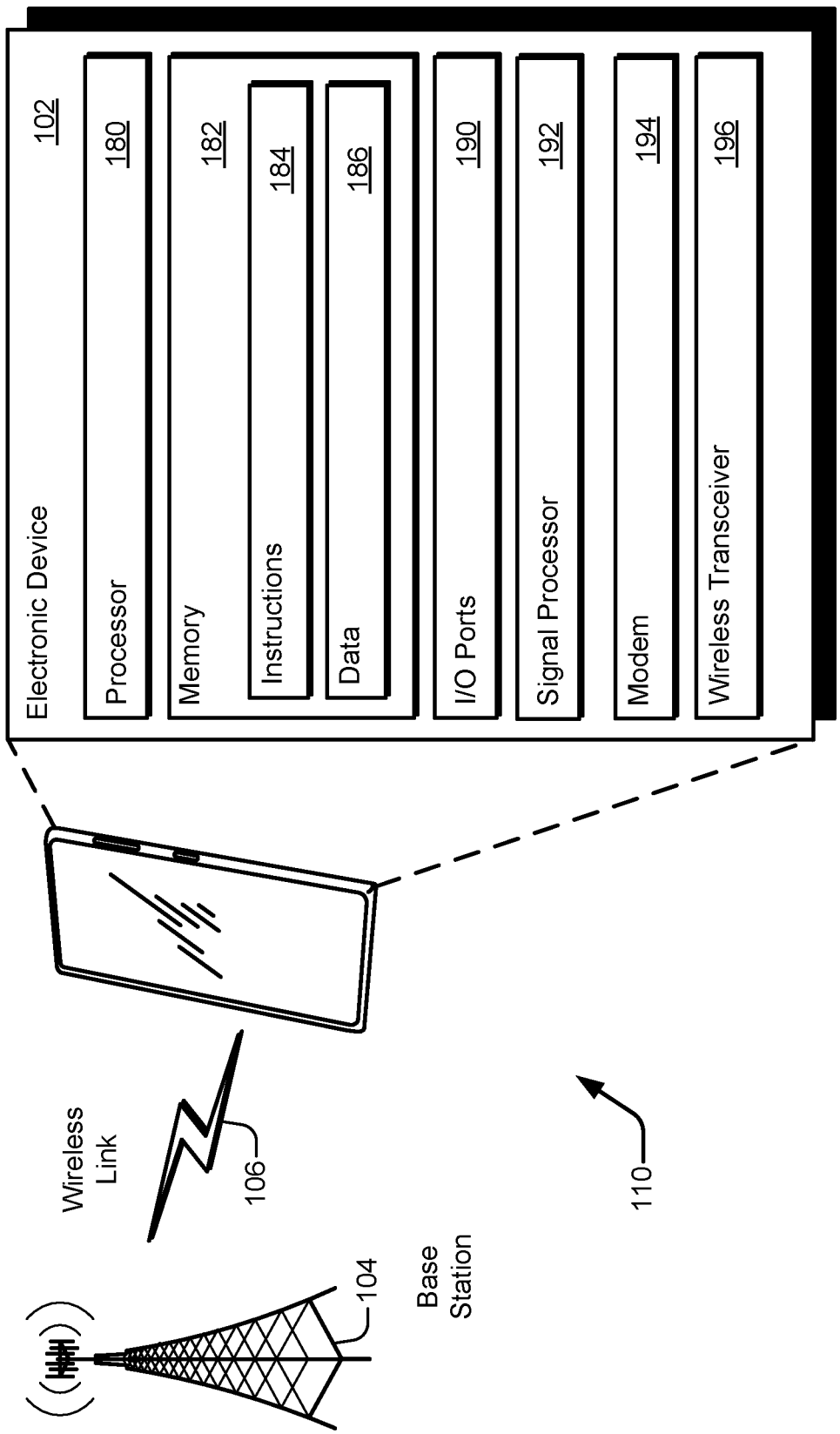
FIG. 1 is a diagram of an environment including an electronic device that includes a transceiver according to certain aspects of the present disclosure.

FIG. 1 is a diagram of an environment 100 including an electronic device 102 that includes a transceiver 196. In the environment 100, the electronic device 102 communicates with a base station 104 through a wireless link 106. As shown, the electronic device 102 is depicted as a smart phone. However, the electronic device 102 may be implemented as any suitable computing or other electronic device, such as a cellular base station, a broadband router, an access point, a cellular or mobile phone, gaming device, a navigation device, a media device, a laptop computer, a desktop computer, a tablet computer, a server computer, a network-attached storage (NAS) device, smart appliance, a vehicle-based communication system, an Internet of Things (IoT) device, a sensor or security device, an asset tracker, and so forth.

The base station 104 communicates with the electronic device 102 via the wireless link 106, which may be implemented as any suitable type of wireless link. Although depicted as a base station tower of a cellular radio network, the base station 104 may represent or be implemented as another device, such as a satellite, a terrestrial broadcast tower, an access point, a peer-to-peer device, a mesh network node, another electronic device generally as described above, and so forth. The wireless link 106 can include a downlink of data and/or control information communicated from the base station 104 to the electronic device 102. The wireless link 106 may also include an uplink of data and/or control information communicated from the electronic device 102 to the base station 104. The wireless link 106 may be implemented using any suitable communication protocol or standard, such as 3rd Generation Partnership Project Long-Term Evolution (3GPP LTE, 3GPP NR 5G), IEEE 802.11, IEEE 802.1, Bluetooth™, and so forth.

The electronic device 102 includes a processor 180 and a memory 182. The memory 182 may be or form a portion of a computer readable storage medium. The processor 180 may include any type of processor, such as an application processor or a multi-core processor, that is configured to execute processor-executable instructions (e.g., code) stored by the memory 182. The memory 182 may include any suitable type of data storage media, such as volatile memory (e.g., random access memory (RAM)), non-volatile memory (e.g., Flash memory), optical media, magnetic media (e.g., disk or tape), and so forth. In the context of this disclosure, the memory 182 is implemented to store instructions 184, data 186, and other information of the electronic device 102, and thus when configured as or part of a computer readable storage medium, the memory 182 docs not include transitory propagating signals or carrier waves.

The electronic device 102 may also include input/output (I/O) ports 190. The I/O ports 190 enable data exchanges or interaction with other devices, networks, or users or between components of the device.

The electronic device 102 may further include a signal processor (SP) 192 (e.g., such as a digital signal processor (DSP)). The signal processor 192 may function similar to the processor and may be capable of executing instructions and/or processing information in conjunction with the memory 182.

For communication purposes, the electronic device 102 also includes a modem 194, the transceiver 196, and one or more antennas. The transceiver 196 provides connectivity to respective networks and other electronic devices connected therewith using radio frequency (RF) signals. The transceiver 196 may facilitate communication over any suitable type of wireless network, such as a wireless local area network (LAN) (WLAN), a peer to peer (P2P) network, a mesh network, a cellular network, a wireless wide area network (WWAN), a navigational network (e.g., the Global Positioning System (GPS) of North America or another Global Navigation Satellite System (GNSS)), and/or a wireless personal area network (WPAN).

Figure 2:
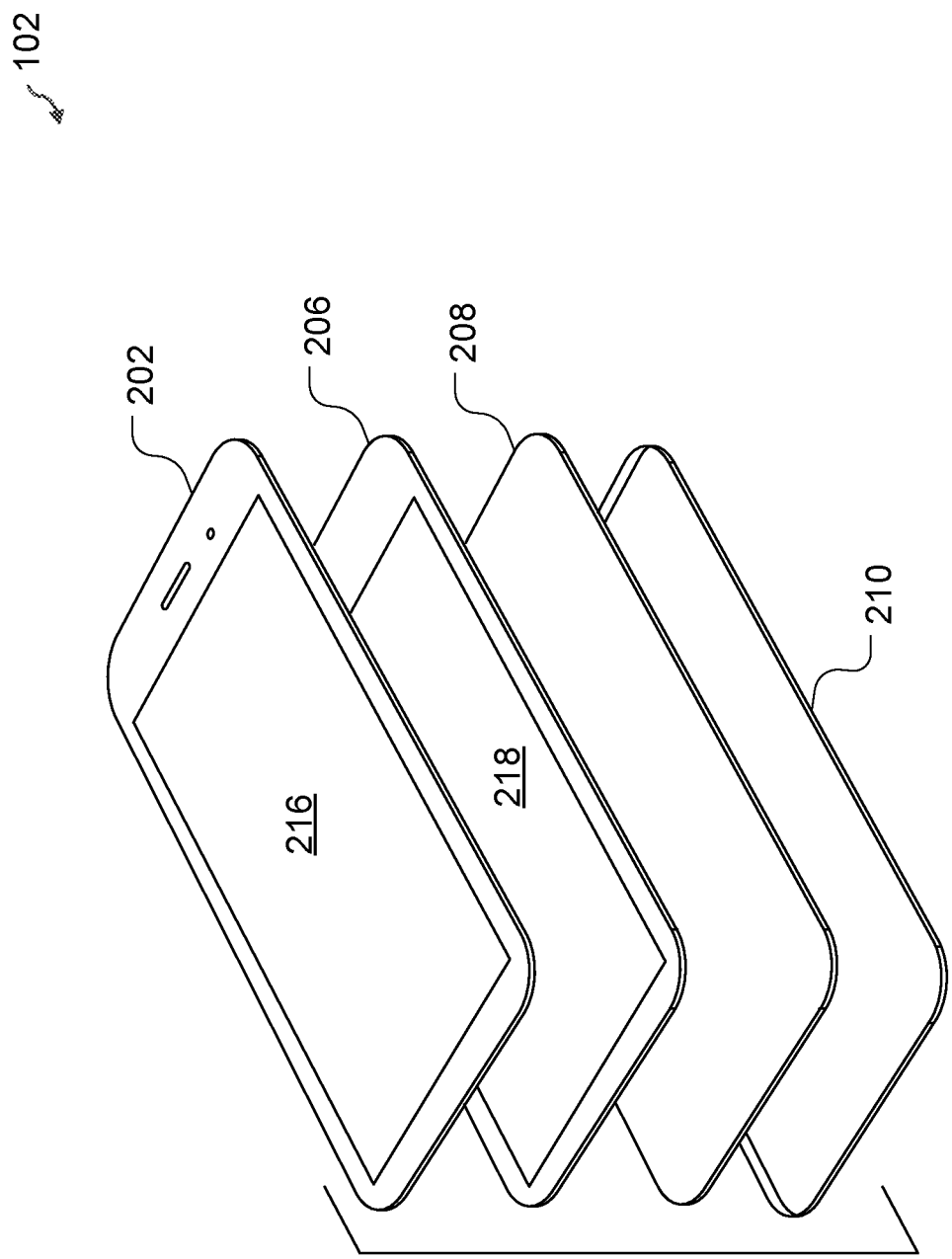
FIG. 2 is an exploded perspective view showing exemplary components of an electronic device according to certain aspects of the present disclosure.

FIG. 2 shows an example in which the electronic device 102 is implemented as a mobile device (e.g., a smartphone). However, as discussed above with reference to FIG. 1, the electronic device 102 is not limited to a mobile device.

In the example shown in FIG. 2, the electronic device 102 includes a top cover 202, a display layer 206, a substrate 208 (e.g., a printed circuit board (PCB), a plastic laminate, a ceramic, any combination thereof, etc.), and a bottom cover 210. In this example, the top cover 202 includes a screen 216. The top cover 202 and the bottom cover 210 provide a housing of the electronic device 102 that retains the display layer 206, the substrate 208 (e.g., PCB), and other components (not shown in FIG. 2) of the electronic device 102 that may or may not be on the substrate 208. The housing may be substantially rectangular as shown in the example in FIG. 2. However, it is to be appreciated that the housing may have other shapes. It is also to be appreciated that the housing may be configured to bend or fold in some implementations. Also, it is to be appreciated that the substrate 208 (e.g., PCB) is not limited to the exemplary size and/or shape shown in FIG. 2.

Figure 3:
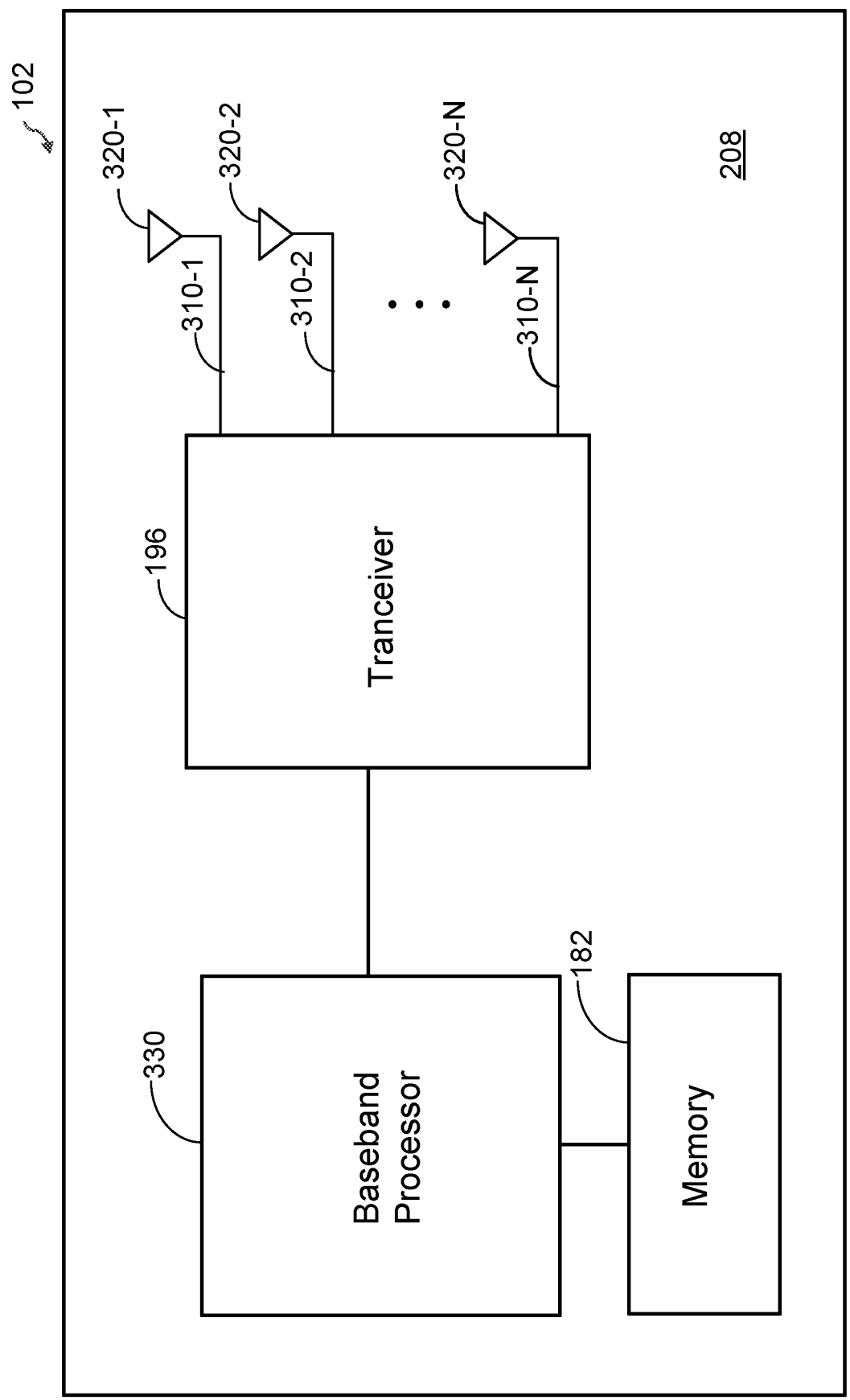
FIG. 3 shows an example of an electronic device including a transceiver and antennas according to certain aspects of the present disclosure.

FIG. 3 shows an example in which the electronic device 102 includes the transceiver 196, the memory 182, and antennas 320-1 to 320-N. The electronic device 102 also includes a baseband processor 330 coupled to the transceiver 196 and the memory 182. The baseband processor 330 may be part of the modem 194, the signal processor 192, and/or the processor 180 discussed above with reference to FIG. 1. The transceiver 196 may be coupled to the baseband processor 330 via one or more signal lines. For example, in some implementations, the transceiver 196 may be coupled to the baseband processor 330 via multiple signal lines arranged in parallel. The transceiver 196, the memory 182, the baseband processor 330, the antennas 320-1 to 320-N, or any combination thereof may be mounted on, formed on, and/or embedded in the substrate 208 (e.g., PCB). For example, in some implementations, the transceiver 196 may be integrated on multiple chips in a multi-chip module.

The transceiver 196 may be coupled to each of the antennas 320-1 to 320-N via respective transmission lines 310-1 to 310-N. A transmission line may also be referred to as a feedline or another term. In certain aspects, the transmission lines 310-1 to 310-N may be implemented with metal traces formed on and/or embedded in the substrate 208 (e.g., PCB). In some implementations, the transceiver 196 may be integrated on one or more chips mounted on the substrate 208, and the antennas 320-1 to 320-N may be external to the one or more chips (e.g., off chip).

Each of the antennas 320-1 to 320-N may be implemented with a patch antenna, a dipole antenna, or another type of antenna. The antennas 320-1 to 320-N may also be referred to as antenna elements or another term. In some implementations, the antennas 320-1 to 320-N may be arranged in a one-dimensional array, a two-dimensional array, a three-dimensional array, or another configuration. In some implementations, one or more of the antennas 320-1 to 320-N may be integrated on an antenna module, which may be mounted on the substrate 208 or mounted on another surface of the electronic device 102.

In some implementations, two or more of the antennas 320-1 to 320-N may face different directions to provide wireless transmission and/or reception in different directions.

The transceiver 196 may be configured to transmit one or more RF signals (e.g., to the base station 104) via one or more of the antennas 320-1 to 320-N. The transceiver 196 may also be configured to receive one or more RF signals (e.g., from the base station 104) via the one or more of the antennas 320-1 to 320-N. The transceiver 196 may transmit and/or receive RF signals using one or more wireless communication technologies, including, but not limited to, a third generation (3G) technology (e.g., CDMA), a fourth generation (4G) technology (also known as long term evolution (LTE)), a fifth generation (5G) technology, one or more technologies based on one or more IEEE 802.11 protocols (e.g., IEEE 802.11ac, IEEE 802.11n, IEEE 802.11ad, IEEE 802.11ax, IEEE 802.11ay, etc.), and/or one or more other technologies. The RF signals may be in a millimeter wave (mmW) frequency band and/or another frequency band. Examples of mmW frequency bands includes mmW frequency bands used in fifth-generation standards.

To transmit data and/or control information (e.g., to the base station 104), the baseband processor 330 may process the data and/or control information into one or more baseband signals. The processing performed by the baseband processor 330 may include coding and/or modulation. The transceiver 196 receives the one or more baseband signals, and processes the one or more baseband signal into one or more RF signals for transmission via one or more of the antennas 320-1 to 320-N. The processing performed by the transceiver 196 may include filtering, frequency upconversion, power amplification, phase shifting, or any combination thereof. In certain aspects, the transceiver 196 may first upconvert the one or more baseband signals into one or more intermediate frequency (IF) signals, and upconvert the one or more IF signals into the one or more RF signals.

To receive data/or control information (e.g., from the base station 104), the transceiver 196 receives one or more RF signals carrying the data and/or control information via one or more of the antennas 320-1 to 320-N. The transceiver 196 may then process the one or more RF signals into one or more baseband signals. The processing performed by the transceiver 196 may include low-noise amplification, frequency downconversion, phase shifting, filtering, or any combination thereof. In certain aspects, the transceiver 196 may first downconvert the one or more RF signals into one or more IF signals, and downconvert the one or more IF signals into the one or more baseband signals. The baseband processor 330 receives the one or more baseband signals, and processes the one or more baseband signals to recover the data and/or control information. The processing performed by the baseband processor 330 may include decoding and/or demodulation.

Figure 4:
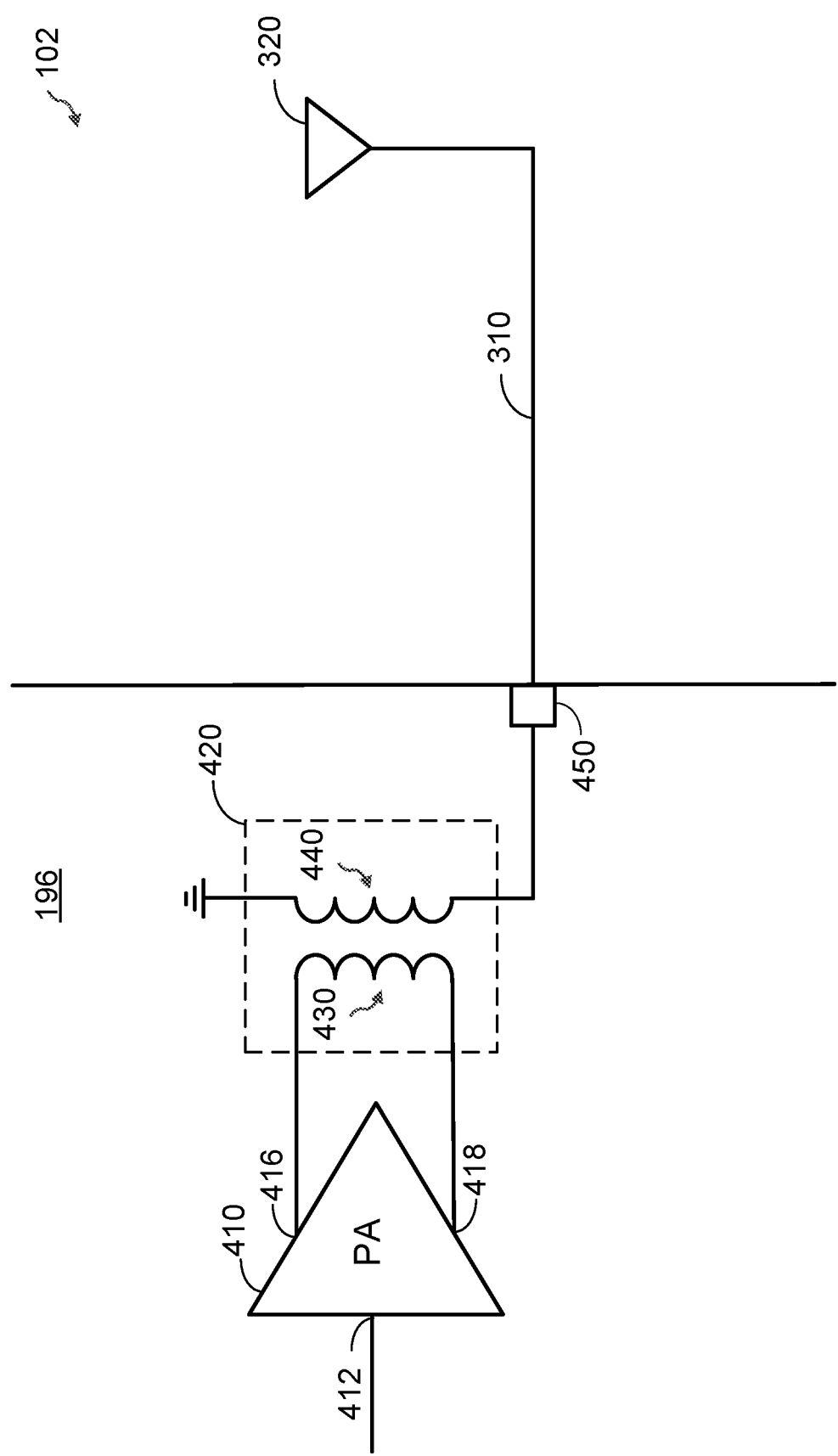
FIG. 4 shows an example of a transceiver including a power amplifier and a transformer according to certain aspects of the present disclosure.

FIG. 4 shows an example of a portion of the transceiver 196 according to certain aspects. In this example, the transceiver 196 includes a power amplifier (PA) 410 and a transformer 420. As shown in FIG. 4, the transformer 420 is coupled to an antenna 320 via a transmission line 310. The antenna 320 may be any one of the one of the antennas 320-1 to 320-N shown in FIG. 3. In some implementations, the transformer 420 is integrated on a chip and the antenna 320 is external to the chip (i.e., off chip). In this example, the transformer 420 may be coupled to the transmission line 310 via an antenna port. The antenna port 450 may include a pad on the chip. The pad may be coupled to the transmission line 310 by a bump (e.g., not shown) and/or another conductor. The transformer 420 may be coupled to the antenna port 450 via metal routing on the chip. However, it is to be appreciated that the present disclosure is not limited to this example. In other examples, the antenna 320 could be configured on chip or share a substrate or other common structure for supporting the power amplifier 410 and the antenna 320 (e.g., integrated together in a module).

Although one PA 410 and one transformer 420 are shown in FIG. 4, it is to be appreciated that the transceiver 196 may include multiple PAs and transformers. For example, the transceiver 196 may include a respective PA and a respective transformer for each antenna among the antennas 320-1 to 320-N shown in FIG. 3 or each antenna among a subset of the antennas 320-1 to 320-N.

The PA 410 is configured to amplify an RF signal for transmission via the antenna 320. In the example shown in FIG. 4, the PA 410 is a differential PA having an input 412 and a differential output including a first output 416 and a second output 418. In this example, the PA 410 is configured to receive an RF signal at the input 412 (e.g., from a mixer or another circuit), amplify the RF signal, and output the amplified RF signal at the differential output. In this example, the amplified RF signal may be a differential RF signal including a first RF signal at the first output 416 and a second signal RF at the second output 418. The input 412 may be a single-ended input or a differential input.

In the example shown in FIG. 4, the transformer 420 includes a first inductor 430 and a second inductor 440 magnetically (i.e., inductively) coupled to one another. The first inductor 430 is coupled between the first output 416 and the second output 418 of the PA 410, and the second inductor 440 is coupled between the antenna 320 and a ground (or some reference potential). Because the first inductor 430 and the second inductor 440 are magnetically coupled, the transformer 420 transfers power from the PA 410 to the antenna 320. In certain aspects, the transformer 420 is configured to transform a differential RF signal at the first inductor 430 into a single-ended RF signal at the second inductor 440 for transmission via the antenna 320.

Figure 5:
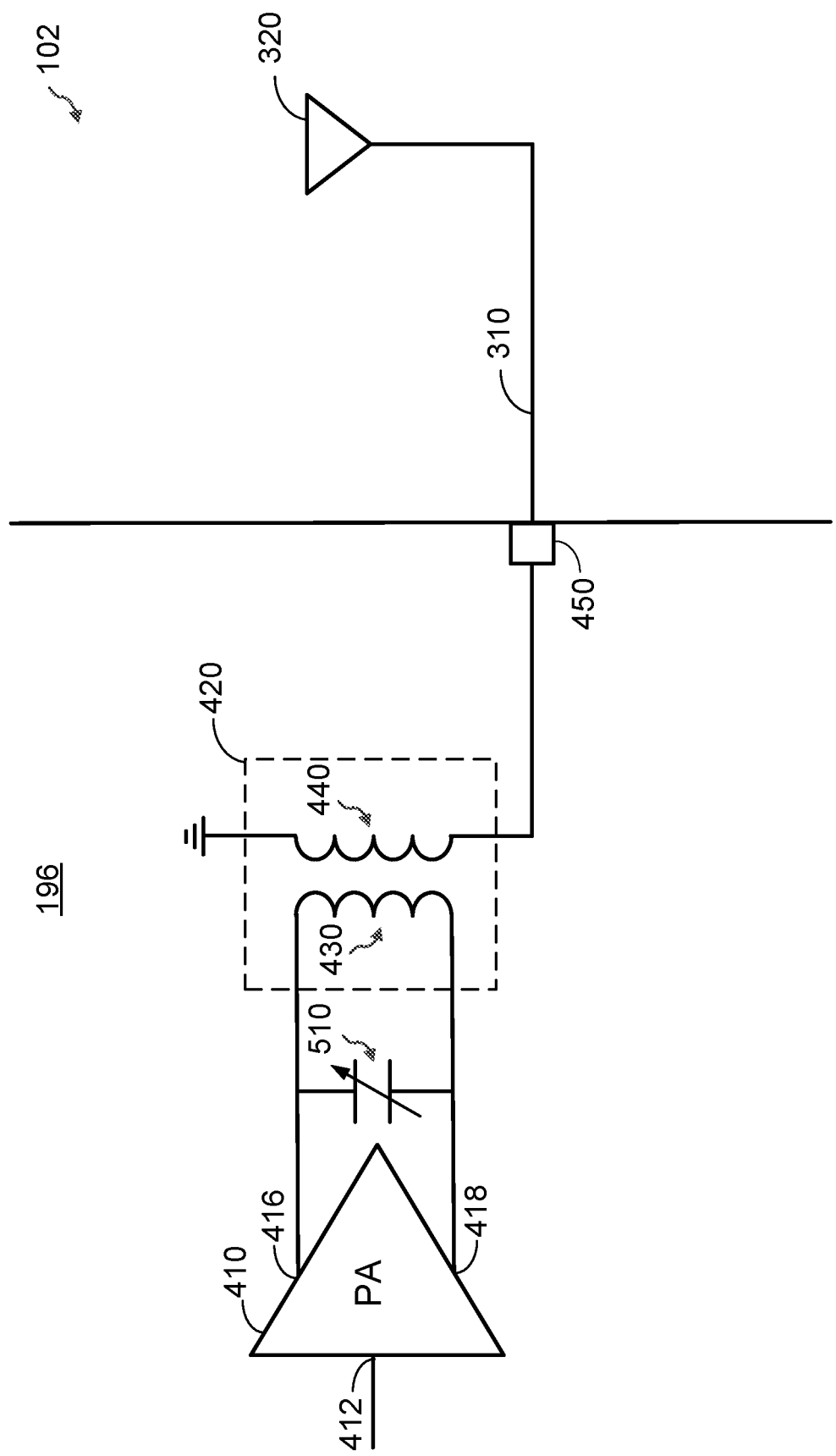
FIG. 5 shows an example of a tunable capacitor coupled in parallel with an inductor of a transformer according to certain aspects of the present disclosure.

It is to be appreciated that the transceiver 196 may include one or more additional components not explicitly shown in FIG. 4. For example, FIG. 5 shows an example in which the transceiver 196 further includes a tunable capacitor 510 coupled in parallel with the first inductor 430. In this example, the first inductor 430 and the tunable capacitor 510 provide a load at the output of the PA 410 with a tunable resonant frequency to increase gain at a desired frequency. In this example, a center tap (not shown) of the first inductor 430 may be coupled to a common-mode voltage. However, it is to be appreciated that the present disclosure is not limited to this example.

Figure 6:
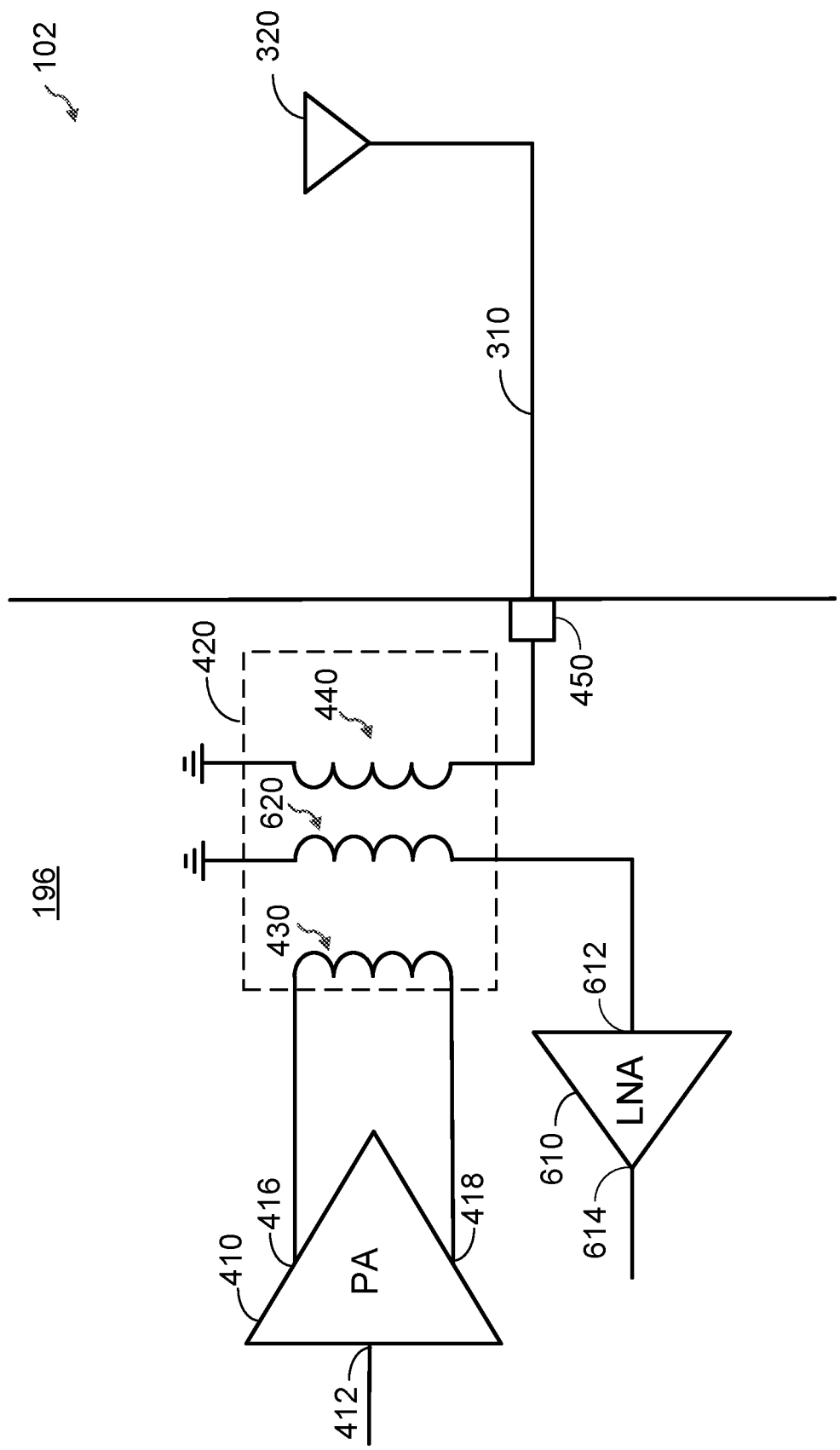
FIG. 6 shows an example of a transceiver including a power amplifier, a low-noise amplifier, and a transformer according to certain aspects of the present disclosure.

FIG. 6 shows an example in which the transceiver 196 further includes a low-noise amplifier (LNA) 610 according to certain aspects. The LNA 610 has an input 612 and an output 614. The LNA 610 is configured to receive an RF signal from the antenna 320 at the input 612, amplify the received RF signal, and output the amplified RF signal at the output 614. The output 614 of the LNA 610 may be coupled to mixer (not shown) used for frequency downconversion, a filter (not shown), and/or another component of the transceiver 196.

In this example, the transformer 420 further includes a third inductor 620 coupled between the input 612 of the LNA 610 and ground (or some reference potential). The third inductor 620 is magnetically (i.e., inductively) coupled with the second inductor 440. Because the second inductor 440 and the third inductor 620 are magnetically coupled, the transformer 420 transfers power of an RF signal received from the antenna 320 to the input 612 of the LNA 610. This allows the LNA 610 to receive and amplify RF signals received by the antenna 320. Thus, in this example, the transformer 420 magnetically (i.e., inductively) couples the PA 410 to the antenna 320, and magnetically (i.e., inductively) couples the antenna 320 to the LNA 610.

In this example, the transformer 420 may also be referred to as a tri-coil transformer since the transformer 420 includes three inductors in this example. However, it is to be appreciated that the transformer 420 is not limited to this example, and that the transformer 420 may include one or more additional inductors in other implementations.

A challenge with using the transceiver 196 is that the impedance of the antenna 320 may vary (e.g., due to changes in the environment). For example, the antenna impedance may change based on how a user is holding the electronic device 102, change due to cross talk between the antenna 320 and other antennas that are active (e.g., one or more of the other ones of the antennas 320-1 to 320-N), change due to a change in frequency band, and the like. Also, the antenna impedance may be affected by the geometry and/or composition of the housing used to house the antenna 320, the location and/or orientation of the antenna 320 within the housing, and the like.

The antenna impedance variation may increase impedance mismatch between the transceiver 196 and the antenna 320, which reduces the efficiency of power transfer between the antenna 320 and the transceiver 196. Because of the reduced power transfer, the output power of the PA 410 needs to be increased to achieve a given transmission power at the antenna 320, which increases power consumption and reduces power efficiency. The increased impedance mismatch may also increase the noise figure of the LNA 610.

To address this, aspects of the present disclosure provide a tunable impedance matching circuit (e.g., antenna tuning circuitry) configured to tune the impedance seen at the transceiver 196 to maintain good impedance matching across variations in the antenna impedance, as discussed further below.

Figure 7:
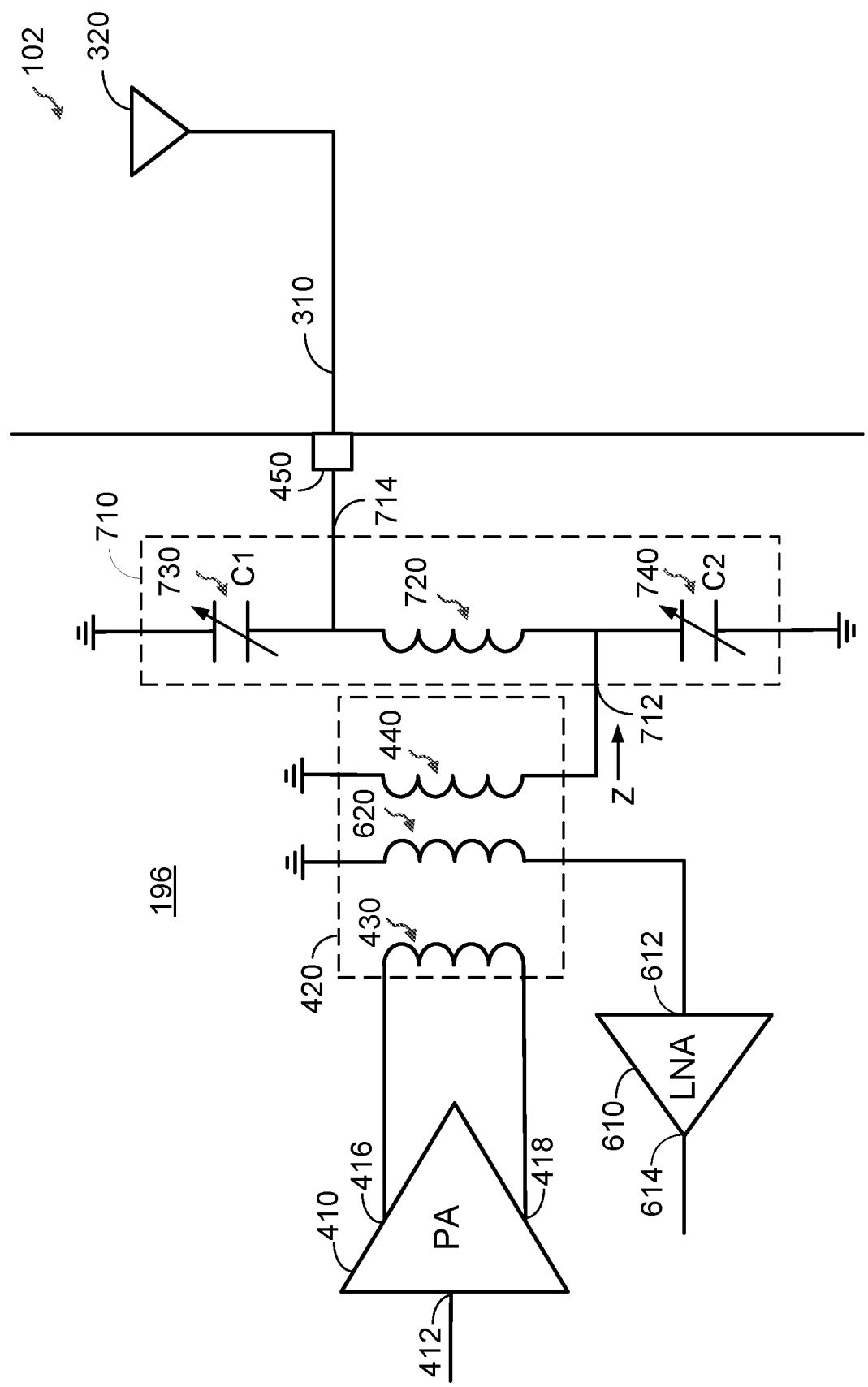
FIG. 7 shows an example of an impedance matching circuit including an inductor, a first capacitor, and a second capacitor according to certain aspects of the present disclosure.

FIG. 7 shows an example in which the electronic device 102 further includes an impedance matching circuit 710 coupled between the transformer 420 and the antenna 320. In this example, the impedance matching circuit 710 has a first terminal 712 coupled to the second inductor 440 of the transformer 420, and a second terminal 714 coupled to the antenna 320 (e.g., via the antenna port 450 and the transmission line 310).

The impedance matching circuit 710 may be configured to tune the impedance (labeled "Z") seen at the first terminal 712 to maintain good impedance matching across variations in the impedance of the antenna 320. For example, good impedance matching may be achieved when the impedance seen at the first terminal 712 is approximately equal to a target impedance (e.g., 50 ohms). In this example, the impedance matching circuit 710 may tune the impedance Z seen at the first terminal 712 to maintain the impedance Z at around the target impedance (e.g., 50 ohms). The good impedance matching increases the efficiency of power transfer between the transceiver 196 and the antenna 320 for better overall system efficiency. It is to be appreciated that the impedance matching circuit 710 need not provide perfect impedance matching.

In this example, the impedance matching circuit 710 includes an inductor 720, a first capacitor 730, and a second capacitor 740. In this example, the inductor 720 is coupled between the first terminal 712 and the second terminal 714. The first capacitor 730 is coupled between the second terminal 714 and ground (or some reference potential), and the second capacitor 740 is coupled between the first terminal 712 and ground (or some reference potential). In this example, the inductor 720, the first capacitor 730, and the second capacitor 740 are arranged to form a pi impedance matching network.

Other types of impedance matching networks are possible such as an L impedance matching network and a T impedance matching network. With regards to the L impedance matching network, the pi impedance matching network provides impedance tuning over a wider range than the L impedance matching network. The T impedance matching network uses series tunable capacitors. However, the series tunable capacitors may require strong drain and source routing for switch transistors in the tunable capacitors in order to handle high currents (e.g., several hundred milli-Amps) for high power applications. The strong drain and source routing degrades the off impedance of the switch transistors and makes it harder to tune the capacitors. In contrast, the pi impedance matching network uses a series inductor (e.g., the inductor 720), which can be more easily designed to handle high currents for high power applications.

In certain aspects, the first capacitor 730 has a first tunable capacitance C1 and the second capacitor 740 has a second capacitance C2. In these aspects, the impedance Z seen at the first terminal 712 may be tuned by tuning the first capacitance C1 and/or the second capacitance C2. For example, if the antenna impedance is low, then the second capacitance C2 of the second capacitor 740 may be tuned to bring the impedance Z close to the target impedance for good impedance matching. If the antenna impedance is high, then the first capacitance C1 of the first capacitor 730 may be tuned to bring the impedance Z close to the target impedance (e.g., 50Ω) for good impedance matching.

In certain aspects, the inductor 720, the first capacitor 730, and the second capacitor 740 may be integrated on the same chip as the inductors 430, 440, and 620. An advantage of integrating the inductor 720 on the chip is that additional pads and/or bumps are not needed to couple the inductor 720 to the capacitors 730 and 740. In contrast, using an external inductor for the inductor 720 may require additional pads and/or bumps and additional metal routing on the substrate 208 for coupling the two ends of the inductor 720 to the capacitors 730 and 740.

Figure 8A:
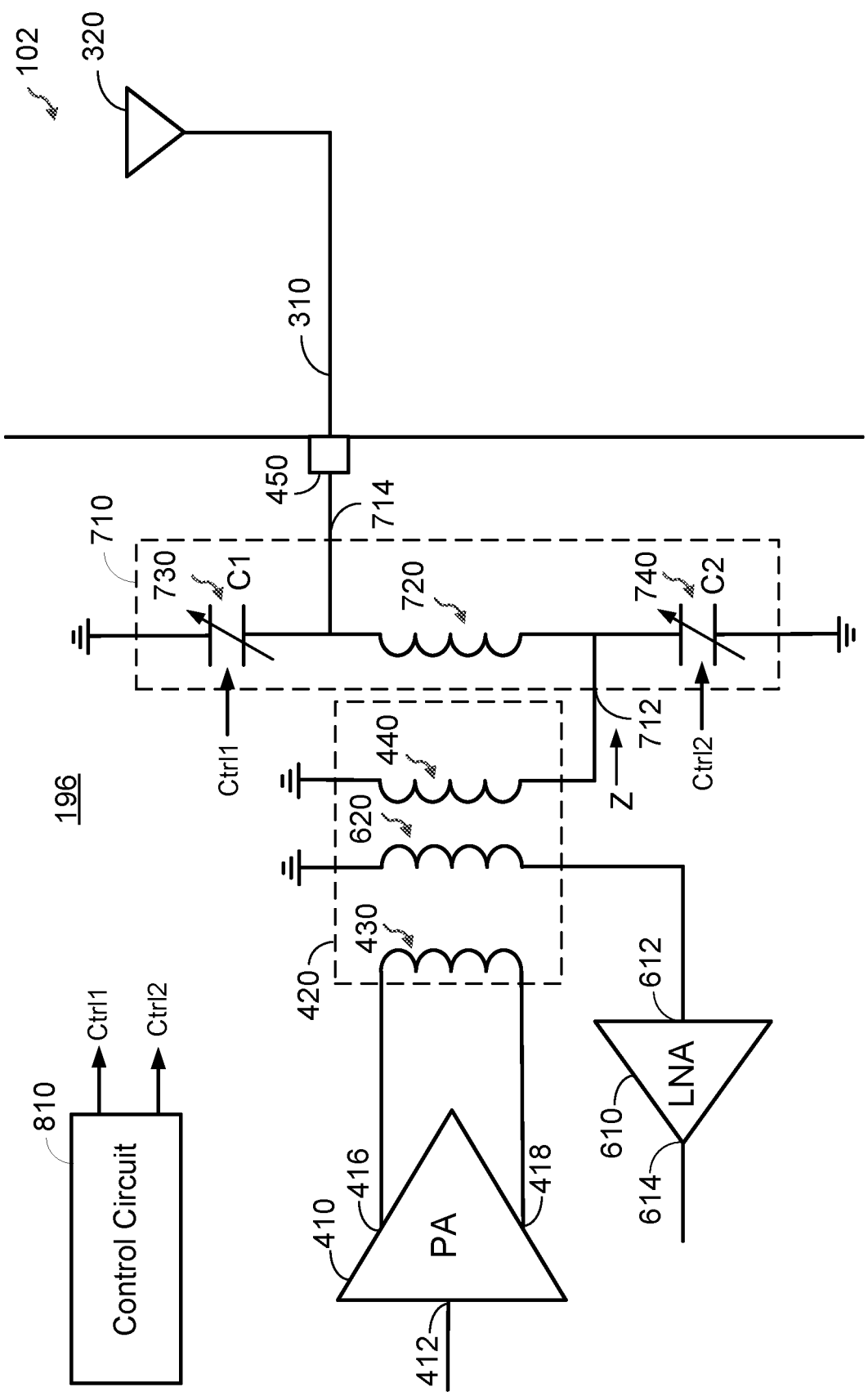
FIG. 8A shows an example of a control circuit configured to control a first capacitance and a second capacitance of the first capacitor and the second capacitor, respectively, of FIG. 7 according to certain aspects.

FIG. 8A shows an example in which the first capacitance C1 of the first capacitor 730 and the second capacitance of C2 of the second capacitor 740 are controlled by a control circuit 810. In this example, the first capacitor 730 is configured to set the first capacitance C1 based on a first control signal (labeled "Ctrl1") from the control circuit 810, and the second capacitor 740 is configured to set the second capacitance C2 based on a second control signal (labeled "Ctrl2") from the control circuit 810.

In certain aspects, each of the first capacitor 730 and the second capacitor 740 may be implemented with a respective digitally programmable capacitor. In this example, the first control signal may include a first digital signal that sets (i.e., programs) the first capacitance C1 digitally. In some implementations illustrated in FIG. 8B, the first capacitor 730 includes a first bank of switchable capacitors 820-1 to 820-$n$, in which the first digital signal sets the first capacitance C1 by controlling which ones of the switchable capacitors 820-1 to 820-$n$ in the first bank are switched on. In certain aspects, the first digital signal includes a digital code including bits in which the bit value of each bit controls whether a respective one of the switchable capacitors 820-1 to 820-$n$ in the first bank is switched on or off. In the example shown in FIG. 8B, the switchable capacitors 820-1 to 820-$n$ are coupled in parallel, and each of the switchable capacitors 820-1 to 820-$n$ includes respective capacitors 832-1 to 832-$n$ and 834-1 to 834-$n$ and a respective switch 830-1 to 830-$n$ (e.g., switch transistor) coupled in series. In this example, the first digital signal switches on a switchable capacitor (i.e., one of the switchable capacitors 820-1 to 820-$n$) by turning on the respective switch (i.e., respective one of the switches 830-1 to 830-$n$), and switches off the switchable capacitor by turning off the respective switch.

Also, in this example, the second control signal may include a second digital signal that sets (i.e., programs) the second capacitance C2 digitally. In some implementations illustrated in FIG. 8B, the second capacitor 740 includes a second bank of switchable capacitors 840-1 to 840-$n$, in which the second digital signal sets the second capacitance C2 by controlling which ones of the switchable capacitors 840-1 to 840-$n$ in the second bank are switched on. In certain aspects, the second digital signal includes a digital code including bits in which the bit value of each bit controls whether a respective one of the switchable capacitors 840-1 to 840-$n$ in the second bank is switched on or off. In the example shown in FIG. 8B, the switchable capacitors 840-1 to 840-$n$ are coupled in parallel, and each of the switchable capacitors 840-1 to 840-$n$ includes respective capacitors 852-1 to 852-$n$ and 854-1 to 854-$n$ and a respective switch 850-1 to 850-$n$ (e.g., switch transistor) coupled in series. In this example, the second digital signal switches on a switchable capacitor (i.e., one of the switchable capacitors 840-1 to 840-$n$) by turning on the respective switch (i.e., respective one of the switches 850-1 to 850-$n$), and switches off the switchable capacitor by turning off the respective switch.

Figure 8B:
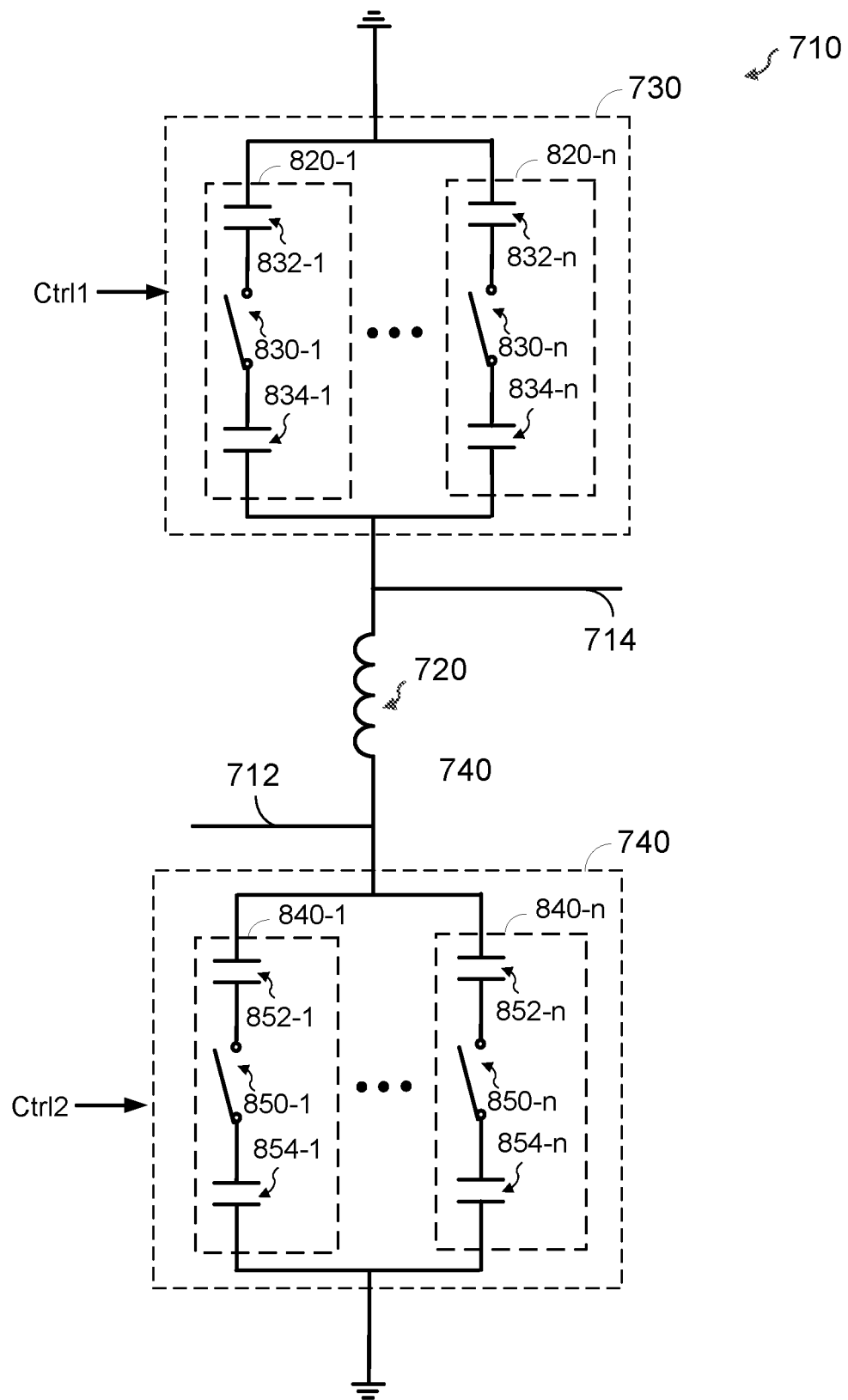
FIG. 8B shows an exemplary implementation of the first capacitor and the second capacitor of FIG. 8A according to certain aspects of the present disclosure.

It is to be appreciated that switchable capacitors 820-1 to 820-$n$ and 840-1 to 840-$n$ are not limited to the arrangements and/or numbers of capacitors and switches shown in the example in FIG. 8B. In general, a switchable capacitor includes one or more capacitors and one or more switches coupled in series.

In certain aspects, the control circuit 810 may store capacitance settings for the capacitors 730 and 740 for different use cases of the electronic device 102 that affect the impedance of the antenna 320. The capacitance settings for the different use cases may be stored (i.e., loaded) in a register or another type of memory. The capacitance settings for each use case may include a setting for the first capacitance C1 and a setting for the second capacitance C2 that provide good impedance matching for the use case. In this example, the control circuit 810 may determine the current use case of the electronic device 102, and set the first capacitance C1 and the second capacitance C2 based on the stored settings for the determined use case.

For the example where the first control signal for the first capacitor 730 includes the first digital signal, the setting of the first capacitance C1 for each use case may be specified by a respective digital code in which the bit values of the bits in the respective digital code control which switchable capacitors 820-1 to 820-$n$ in the first bank are switched on. Also, for the example where the second control signal for the second capacitor 740 includes the second digital signal, the setting of the second capacitance C2 for each use case may be specified by a respective digital code in which the bit values of the bits in the respective digital code control which switchable capacitors 840-1 to 840-$n$ in the second bank are switched on. In this example, for each use case, the control circuit 810 may store a respective pair of digital codes (i.e., one digital code for the first capacitance C1 and one digital code for second capacitance C2). In operation, the control circuit 810 may determine the current use case of the electronic device 102, and set the first capacitance C1 and the second capacitance C2 based on the stored digital codes for the determined use case.

In some implementations, the transceiver 196 may support beamforming to transmit RF signals in any one of multiple beam directions using all of the antennas 320-1 to 320-N or a subset of the antennas 320-1 to 320-N. In this example, the impedance of the antenna 320 may be different for the different beam directions (e.g., due to different transmission powers at different angles for the different beam directions). In this example, for each beam direction, the control circuit 810 may store a respective capacitance setting for the first capacitance C1 and a respective setting for the second capacitance C2 that provide good impedance matching for the beam direction. For the example where the capacitors 730 and 740 are digitally tuned (i.e., programmed), the capacitance settings for the capacitances C1 and C2 may be specified by a respective pair of digital codes. In operation, the control circuit 810 may determine the current beam direction, and set the first capacitance C1 and the second capacitance C2 based on the stored capacitance settings (e.g., digital codes) for the determined beam direction.

In certain aspects, the beam direction may be controlled by a beamformer (not shown) in the transceiver 196. In these aspects, the control circuit 810 may receive a signal from the beamformer indicating the current beam direction, and determine the current beam direction based on the received signal.

In some implementations, the transceiver 196 may support an adaptive power control scheme in which the power delivered to the antenna 320 is detected using a power coupler (not shown) or a PA drain detector, and a power controller adjusts the output power of the PA 410 based on the detected power. In this example, the control circuit 810 may use the detected power to tune the first capacitance C1 and the second capacitance C2 to find the capacitance settings of the first capacitance C1 and the second capacitance C2 that result in the highest power (e.g., average power) delivered to the antenna 320 based on the detected power. In this example, higher power is indicative of higher efficiency of power transfer to the antenna 320 and therefore better impedance matching.

For the example where the inductor 720 is integrated on the chip, it is desirable for the inductor 720 to have very low magnetic coupling with the inductors 430, 440, and 620. This is because large magnetic coupling between the inductor 720 and the inductors 430, 440, and 620 may have a large impact on the characteristics of the transformer 420, and may complicate the design of the transformer 420 to account for the magnetic coupling with the inductor 720. One approach to reduce magnetic coupling between the inductor 720 and the inductors 430, 440, and 620 is to locate the inductor 720 away from the inductors 430, 440, and 620 on the chip. However, this approach may require a large additional area on the chip to accommodate the inductor 720. To address this, aspects of the present disclosure provide inductor designs for the inductor 720 that allow the inductor 720 to completely or substantially overlap the inductors 430, 440, and 620 of the transformer 420 for high area efficiency while maintaining very low magnetic coupling between the inductor 720 and the inductors 430, 440, and 620, as discussed further below.

Figure 9B:
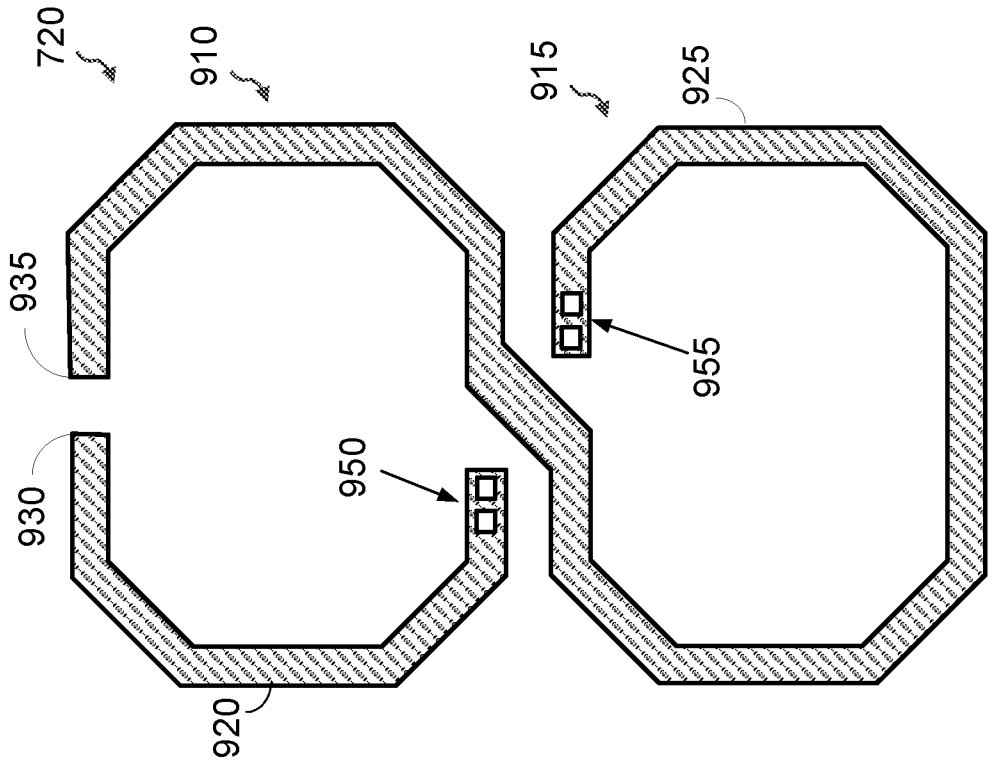
FIG. 9B shows the inductor of FIG. 9A with a bridge of the inductor shown in FIG. 9A removed according to certain aspects of the present disclosure.
Figure 9A:
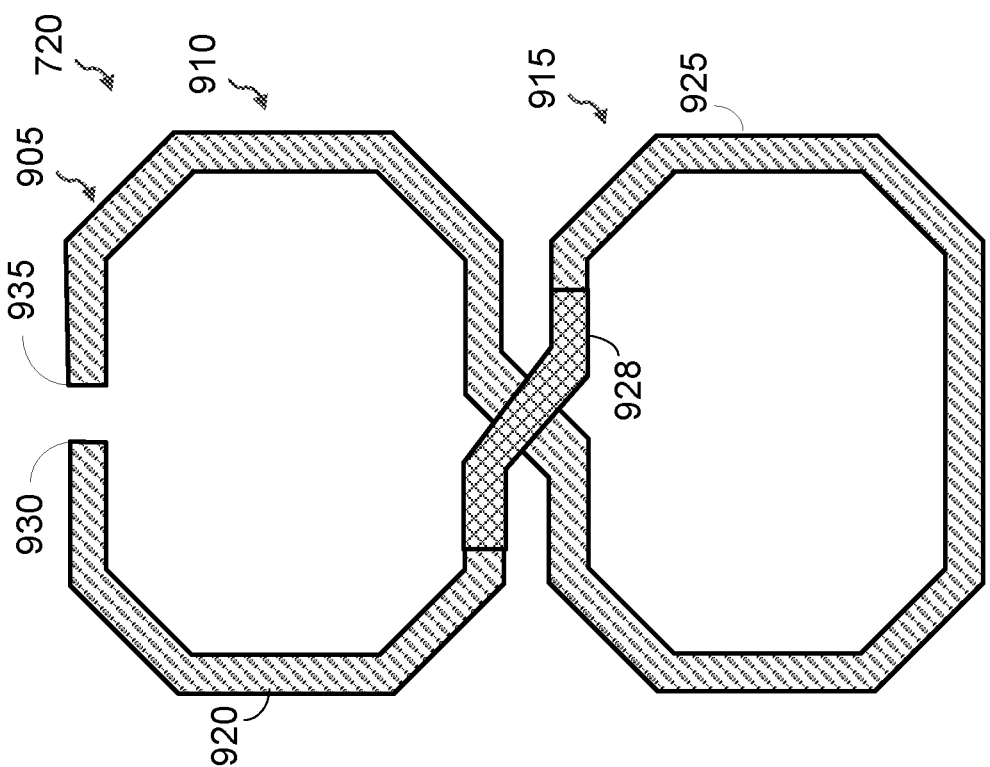
FIG. 9A shows a top view of an exemplary layout of an inductor of an impedance matching circuit according to certain aspects of the present disclosure.

FIG. 9A shows a top view of an exemplary layout of the inductor 720 according to certain aspects. In this example, the inductor 720 includes an 8-shape conductor path 905 forming a first loop 910 and a second loop 915. The 8-shape conductor path 905 may be formed from two or more metal layers on the chip is some implementations (e.g., using photolithographic and etching processes). The 8-shape conductor path 905 may also be referred to as a figure-8 conductor path, or another term. As discussed further below, the 8-shape conductor path 905 substantially reduces magnetic coupling between the inductor 720 and one or more other inductors (e.g., one or more of inductors 430, 440, and 620) overlapping the inductor 720.

In this example, the conductor path 905 includes a first portion 920, a second portion 925, and a bridge 928 coupling the first portion 920 and the second portion 925. The bridge 928 allows the conductor path 905 to cross over itself to form the 8 shape (also referred to a FIG. 8). In one example, the first portion 920 and the second portion 925 may be formed from a first metal layer on the chip (e.g., using a photolithographic and etching process), and the bridge 928 may be formed from a second metal layer on the chip (e.g., using a photolithographic and etching process). The second metal layer may be located either above or below the first metal layer on the chip.

In the example shown in FIG. 9A, the second metal layer is located above the first metal layer. As a result, the bridge 928 crosses over the second portion 925 of the conductor path 905 in this example. However, it is to be appreciated, that in other implementations, the second metal layer may be located below the first metal layer, in which case the bridge 928 crosses under the second portion 925 of the conductor path 905. FIG. 9B shows a view of the inductor 720 without the bridge 928. In this example, the inductor 720 includes one or more vias 950 coupling the first portion 920 of the conductor path 905 to the bridge 928 (shown in FIG. 9A) and one or more vias 955 coupling the second portion 925 of the conductor path 905 to the bridge 928.

In this example, the inductor 720 has a first terminal 930 and a second terminal 935. The first terminal 930 may be coupled to the first terminal 712 of the impedance matching circuit 710 (e.g., by metal routing on the chip), and the second terminal 935 may be coupled to the second terminal 714 of the impedance matching circuit 710 (e.g., by metal routing on the chip), or vice versa. As shown in FIG. 9A, the first terminal 930 may be located at one end of the conductor path 905 and the second terminal 935 may be located at the other end of the conductor path 905.

As discussed above, the 8-shape conductor path 905 of the inductor 720 in this example substantially reduces magnetic coupling between the inductor 720 and one or more other inductors (e.g., one or more of inductors 430, 440, and 620) overlapping the inductor 720. This is because, when current flows into the inductor 720, the 8-shape conductor path 905 causes the current to flow in opposite directions in the first loop 910 and the second loop 915, which generates a magnetic flux within the first loop 910 and a magnetic flux within the second loop 915 having opposite polarities. The opposite polarities of the magnetic flux within the first loop 910 and the magnetic flux within the second loop 915 substantially reduces magnetic coupling from the inductor 720 to one or more other inductors (e.g., one or more of inductors 430, 440, and 620) overlapping the inductor 720.

Figure 9D:
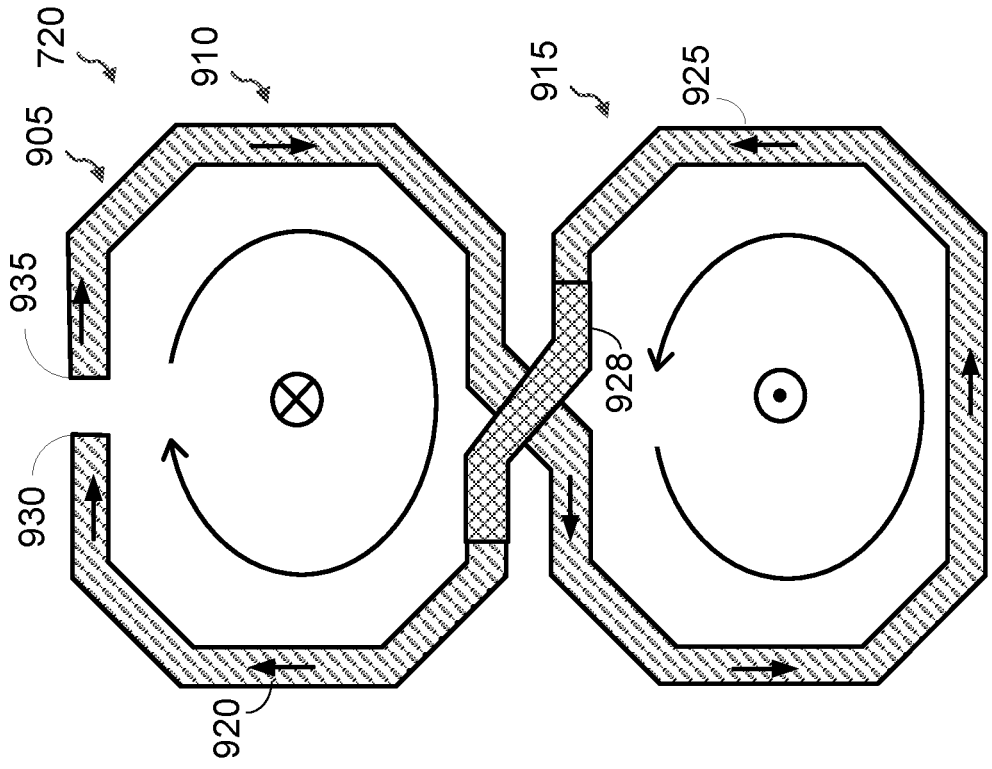
FIG. 9D shows another example of current flow in the inductor of FIG. 9A according to certain aspects of the present disclosure.
Figure 9C:
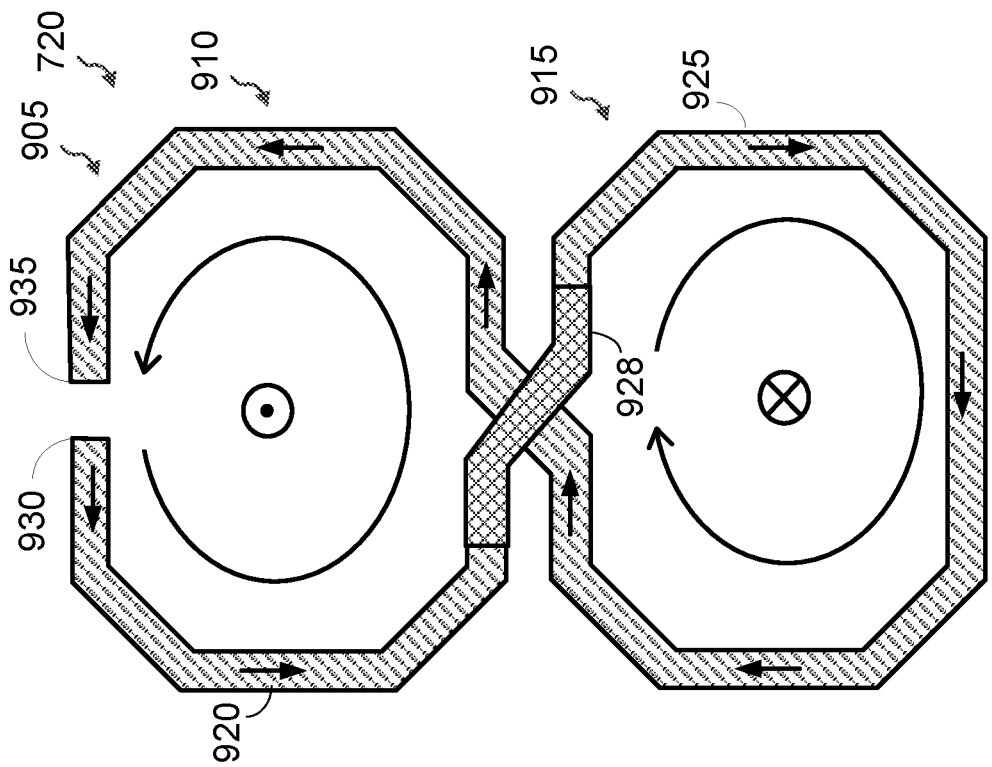
FIG. 9C shows an example of current flow in the inductor of FIG. 9A according to certain aspects of the present disclosure.

The opposite directions of the current flow in the first loop 910 and the current flow the second loop 915 of the inductor 720 is illustrated in FIGS. 9C and 9D. FIG. 9C shows an example in which current flows into the first terminal 930 of the inductor 720. The direction of the current flow in the conductor path 905 is indicated by arrows. In this example, the current flows in the counterclockwise direction in the first loop 910 and flows in the clockwise direction in the second loop 915. As a result, the magnetic field of the magnetic flux within the first loop 910 is directed out of the page, and the magnetic field of the magnetic flux within the second loop 915 is directed into the page.

FIG. 9D shows an example in which current flows into the second terminal 935 of the inductor 720. The direction of the current flow in the conductor path 905 is indicated by arrows. In this example, the current flows in the clockwise direction in the first loop 910 and flows in the counterclockwise direction in the second loop 915. As a result, the magnetic field of the magnetic flux within the first loop 910 is directed into of the page, and the magnetic field of the magnetic flux within the second loop 915 is directed out of the page.

In both cases illustrated in FIGS. 9C and 9D, the current flows in opposite directions in the first loop 910 and the second loop 915, which generates a magnetic flux within the first loop 910 and a magnetic flux within the second loop 915 having opposite polarities.

Figure 10:
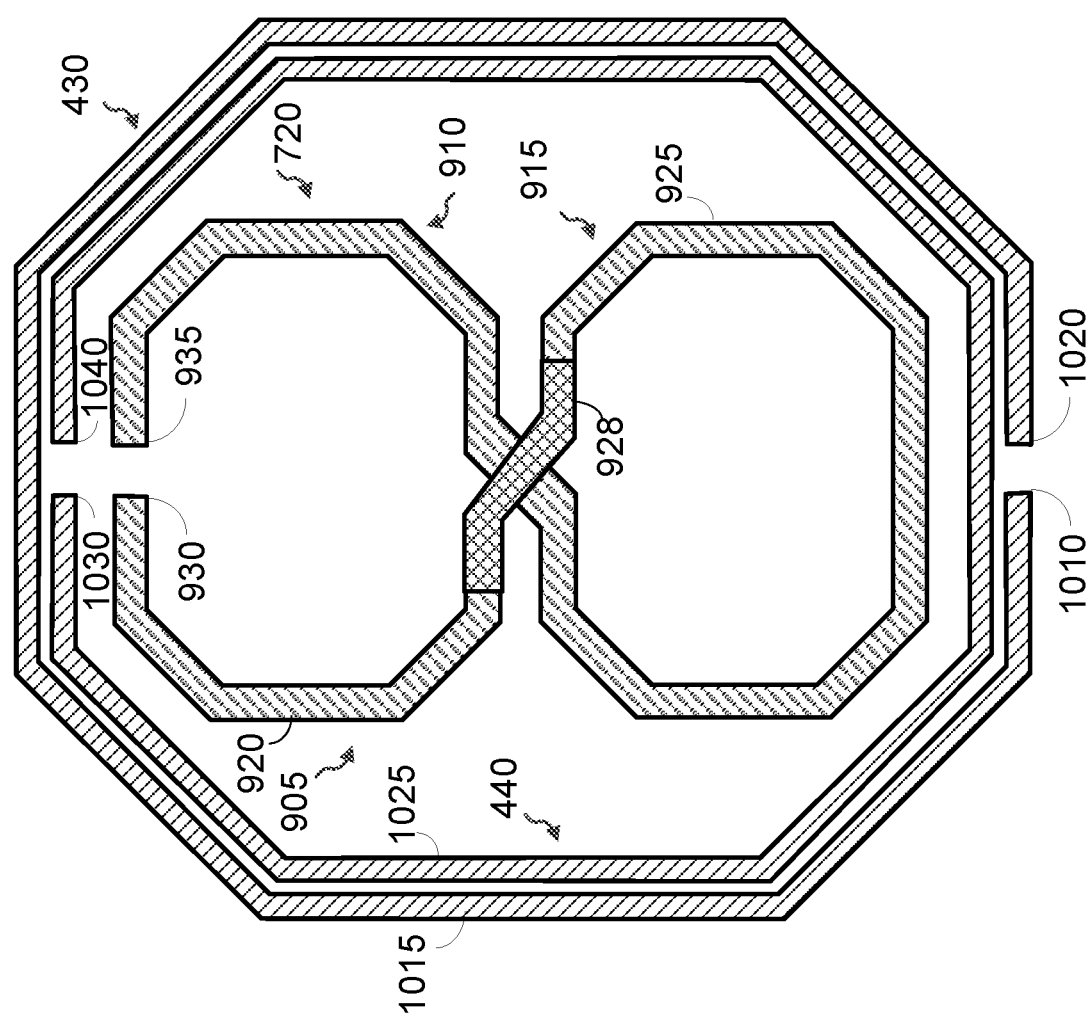
FIG. 10 shows a top view of an example in which the inductor of FIG. 9A overlaps a first inductor and a second inductor according to certain aspects.

FIG. 10 shows a top view of an exemplary layout of the inductor 720, the first inductor 430, and the second inductor 440 according to certain aspects of the present disclosure. In this example, the first inductor 430 is implemented with a loop inductor having a first terminal 1010 and a second terminal 1020. The first terminal 1010 and the second terminal 1020 may be coupled between the outputs 416 and 418 of the PA 410 (e.g., by metal routing on the chip). Also, in this example, the second inductor 440 is implemented with a loop inductor having a first terminal 1030 and a second terminal 1040. The first terminal 1030 may be coupled to the first terminal 712 of the impedance matching circuit 710 and the second terminal 1040 may be coupled to ground (or some reference potential), or vice versa.

In the example in FIG. 10, the loop 1025 of the second inductor 440 is located within the loop 1015 of the first inductor 430 to enhance magnetic coupling between the first inductor 430 and the second inductor 440. In this example, the first inductor 430 and the second inductor 440 may be formed from the same metal layer on the chip (e.g., using a photolithographic and etching process). However, it is to be appreciated that the present disclosure is not limited to this example. For example, in other implementations, the first inductor 430 and the second inductor 440 may be formed from different metal layers.

The inductor 720 overlaps the first inductor 430 and the second inductor 440. As used herein, an inductor may overlap another inductor when the inductor overlaps an area within a loop of the other inductor. In the example shown in FIG. 10, the inductor 720 overlaps the area within the loops 1015 and 1025 of the first and second inductors 430 and 440. As a result, the inductor 720 does not take up additional area on the chip in this example, thereby improving area efficiency. As discussed above, the current flow in the inductor 720 generates a magnetic flux within the first loop 910 and a magnetic flux within the second loop 915 having opposite polarities. Because of their opposite polarities, the magnetic flux of the first loop 910 cancels the magnetic flux of the second loop 915 within the loops 1015 and 1025 of the inductors 430 and 440, which substantially reduces magnetic coupling from the inductor 720 to the inductors 430 and 440. As a result, the inductor 720 is weakly magnetically coupled to the first inductor 430 and the second inductor 440. In certain aspects, the first loop 910 and the second loop 915 of the inductor 720 may completely overlap the area within the loops 1015 and 1025 of the inductor 430 and 440.

The first and second portions 920 and 925 of the conductor path 905 of the inductor 720 may be formed from the same metal layer as the inductors 430 and 440, or the first and second portions 920 and 925 of the conductor path 905 of the inductor 720 may be formed from a different metal layer on the chip.

In the example illustrated in FIG. 10, each of the inductors 430 and 440 has a single loop. However, it is to be appreciated that the present disclosure is not limited to this example. For example, in some implementations, the first inductor 430 may include two or more loops, and/or the second inductor 440 may include two or more loops.

Figure 11:
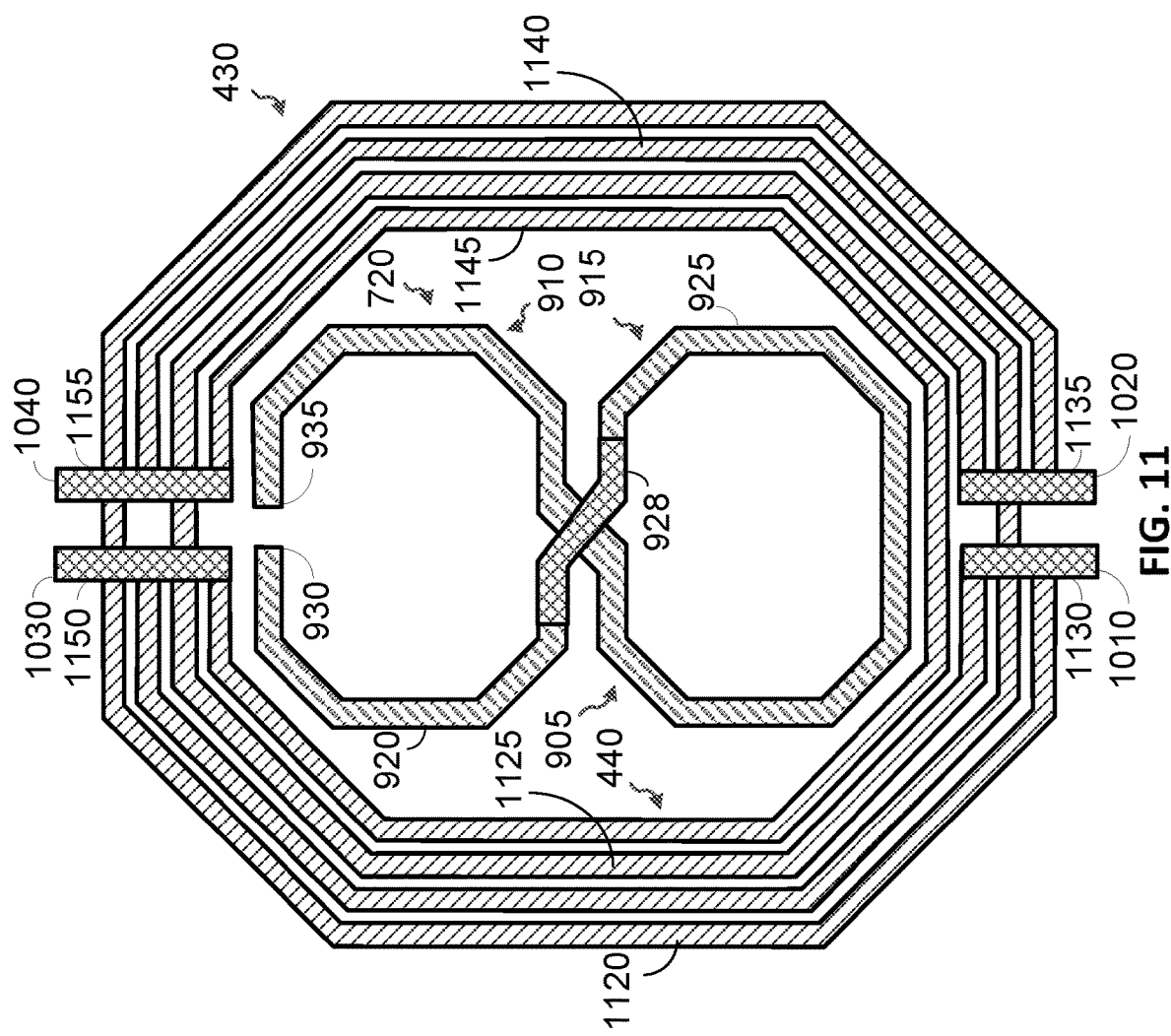
FIG. 11 shows an example of a first inductor including two loops and a second inductor including two loops according to aspects of the present disclosure.

In this regard, FIG. 11 shows an example in which the first inductor 430 includes two loops coupled in parallel, and the second inductor 440 includes two loops coupled in parallel. More particularly, in this example, the first inductor 430 includes a first loop 1120 (e.g., output loop) and a second loop 1125 (e.g., inner loop) within the first loop 1120. The first inductor 430 also includes a first bridge 1130 coupling a first end of the first loop 1120 to a first end of the second loop 1125, and a second bridge 1135 coupling a second end of the first loop 1120 to a second end of the second loop 1125. As shown in FIG. 11, the first terminal 1010 is located at the first bridge 1130 and the second terminal 1020 is located at the second bridge 1135 in this example.

In this example, the second inductor 440 includes a first loop 1140 (e.g., output loop) and a second loop 1145 (e.g., inner loop) within the first loop 1140. The second inductor 440 also includes a first bridge 1150 coupling a first end of the first loop 1140 to a first end of the second loop 1145, and a second bridge 1155 coupling a second end of the first loop 1140 to a second end of the second loop 1145. As shown in FIG. 11, the first terminal 1030 is located at the first bridge 1150 and the second terminal 1040 is located at the second bridge 1155 in this example.

In the example shown in FIG. 11, the first loop 1140 of the second inductor 440 is located between the first loop 1120 and the second loop 1125 of the first inductor 430, and the second loop 1125 of the first inductor 430 is located between the first loop 1140 and the second loop 1145 of the second inductor 440. This feature enhances magnetic coupling between the first inductor 430 and the second inductor 440. In the example shown in FIG. 11, the first and second bridges 1130 and 1135 of the first inductor 430 pass over the first loop 1140 of the second inductor 440, and the first and second bridges 1150 and 1155 of the second inductor 440 pass over the first and second loops 1120 and 1125 of the first inductor 430.

It is to be appreciated that the present disclosure is not limited to the example illustrated in FIG. 11. For example, the first inductor 430 and the second inductor 440 may each include one or more additional loops in addition to the loops shown in FIG. 11.

Figure 12B:
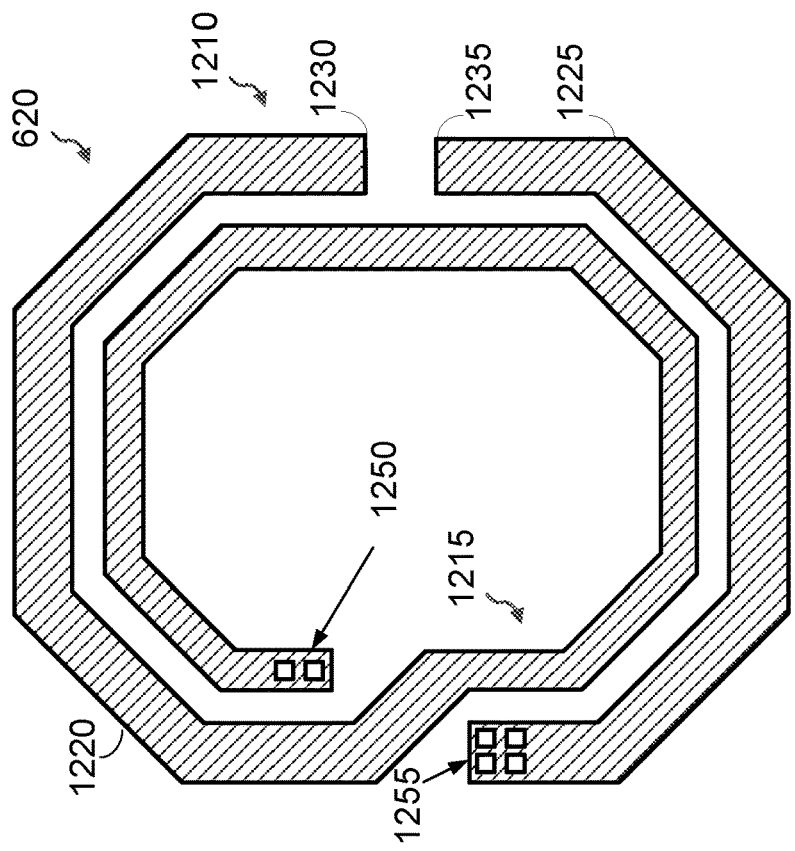
FIG. 12B shows the inductor of FIG. 12A with a bridge of the inductor shown in FIG. 12A removed according to certain aspects of the present disclosure.
Figure 12A:
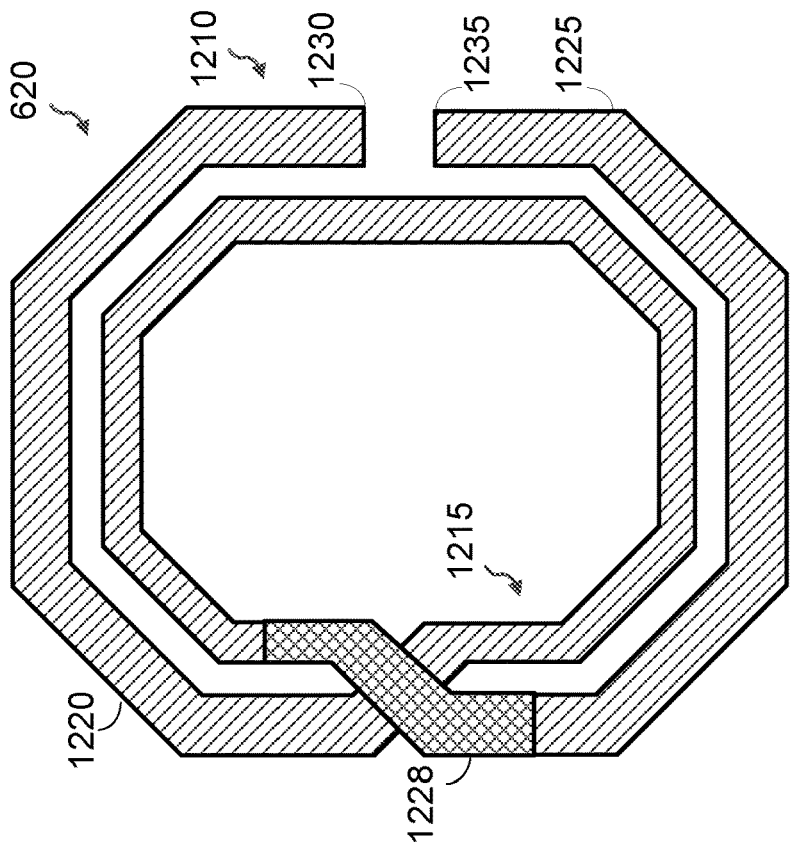
FIG. 12A shows a top view of another exemplary layout of an inductor according to certain aspects of the present disclosure.

FIG. 12A shows a top view of an exemplary layout of the third inductor 620 according to certain aspects. In this example, the third inductor 620 has an outer loop 1210 and an inner loop 1215. The third inductor 620 may also include a bridge 1228 coupling a first portion 1220 of the third inductor 620 and a second portion 1225 of the third inductor 620. The bridge 1228 allows the third inductor 620 to cross over itself. In one example, the first portion 1220 and the second portion 1225 may be formed from a first metal layer on the chip (e.g., using a photolithographic and etching process), and the bridge 1228 may be formed from a second metal layer on the chip (e.g., using a photolithographic and etching process). The second metal layer may be located either above or below the first metal layer.

In the example shown in FIG. 12A, the second metal layer is located above the first metal layer. As a result, the bridge 1228 crosses over the first portion 1220 of the third inductor 620 in this example. However, it is to be appreciated, that in other implementations, the second metal layer may be located below the first metal layer, in which case the bridge 1228 crosses under the first portion 1220 of the third inductor 620. FIG. 12B shows a view of the third inductor 620 without the bridge 1228. In this example, the third inductor 620 includes one or more vias 1250 coupling the first portion 1220 of the third inductor 620 to the bridge 1228 (shown in FIG. 12A) and one or more vias 1255 coupling the second portion 1225 of the third inductor 620 to the bridge 1228.

In this example, the third inductor 620 has a first terminal 1230 and a second terminal 1235. The first terminal 1230 may be coupled to the input 612 of the LNA 610 (e.g., by metal routing on the chip), and the second terminal 1235 may be coupled to ground (or some reference potential), or vice versa.

Figure 13:
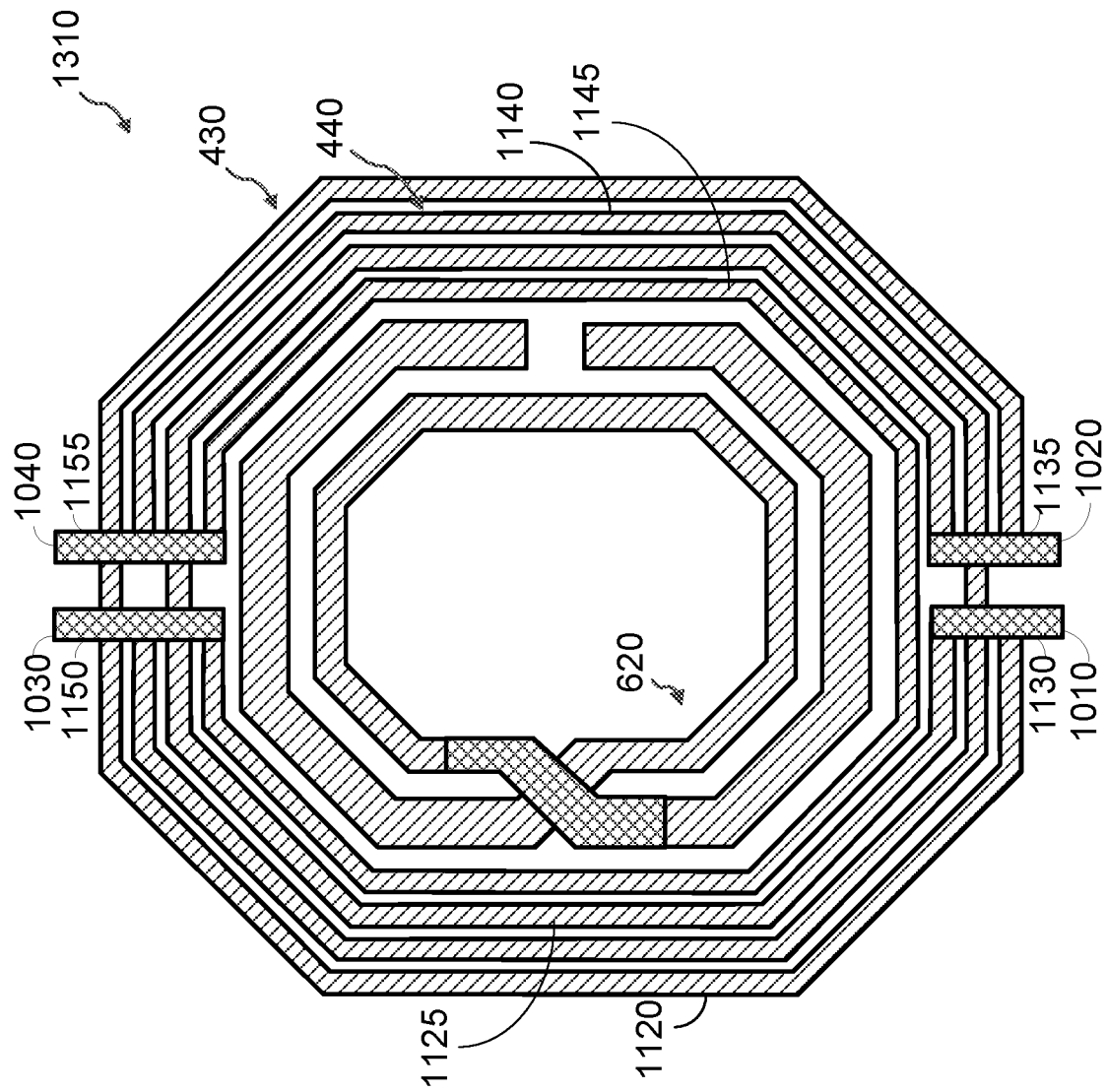
FIG. 13 shows an example of a structure including multiple inductors according to certain aspects of the present disclosure.

FIG. 13 shows an example in which the third inductor 620 shown in the example in FIG. 12 is located within the loops 1140 and 1145 of the second inductor 440 to enhance magnetic coupling from the second inductor 440 to the third inductor 620. The magnetic coupling between the second inductor 440 and the third inductor 620 facilitates the transfer of power of an RF signal from the antenna 320 to the LNA 610. In this example, the first inductor 430, the second inductor 440, and the third inductor 760 form a tri-coil structure 1310.

Figure 14:
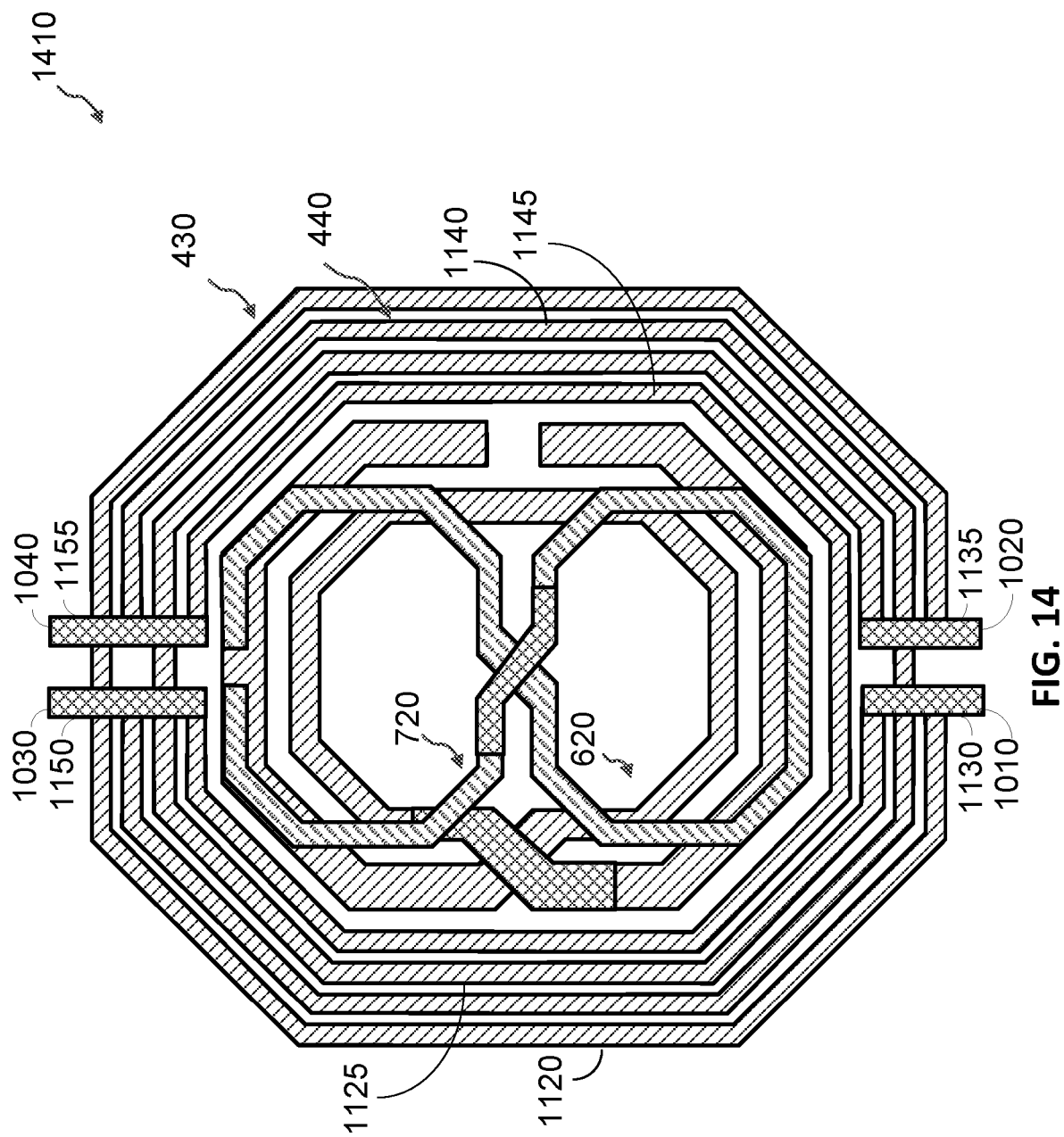
FIG. 14 shows another example of a structure including multiple inductors according to certain aspects of the present disclosure.

FIG. 14 shows an example in which the inductor 720 overlaps the tri-coil structure 1310 shown in FIG. 13 to form a quad-coil structure 1410. In this example, the inductor 720 overlaps the tri-coil structure 1310 shown in FIG. 13. As a result, the inductor 720 does not require additional chip area in this example.

As discussed above, the current flow in the inductor 720 generates a magnetic flux within the first loop 910 and a magnetic flux within the second loop 915 having opposite polarities. Because of their opposite polarities, the magnetic flux of the first loop 910 cancels the magnetic flux of the second loop 915 within the loops of the inductors 430, 440, and 620, which substantially reduces magnetic coupling from the inductor 720 to the inductors 430, 440, and 620.

In the example shown in FIG. 14, the first loop 910 and the second loop 915 of the inductor 720 overlaps the area within the loops 1120 and 1125 of the first inductor 430, and overlaps the area within the loops 1140 and 1145 of the second inductor 440. The first loop 910 and the second loop 915 of the inductor 720 also overlap the area within the loops of the third inductor 620.

Although FIG. 14 shows an example where each of the inductors 430, 440, and 620 includes two loops, it is to be appreciated that the present disclosure is not limited to this example. For example, in other implementation, one or more of the inductors 430, 440, and 620 may each include a single loop, or one or more of the inductors 430, 440, and 620 may each include three or more loops.

It is to be appreciated that the inductor 720 is not limited to one 8-shape conductor path, and that the inductor 720 may include two or more 8-shape conductor paths (e.g., coupled in series and/or parallel).

Figure 15:
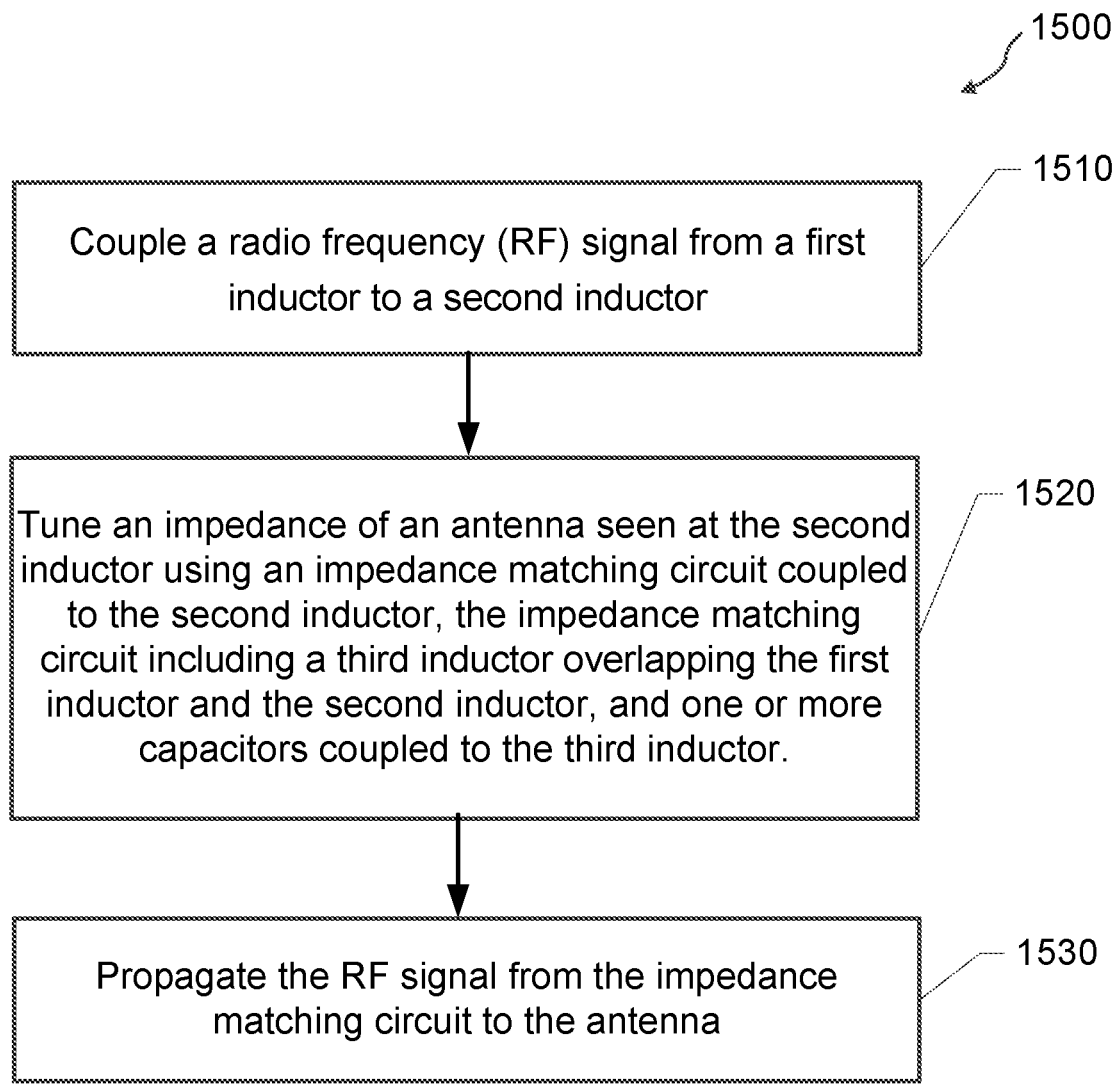
FIG. 15 is a flowchart showing an example of a method for antenna tuning according to certain aspects of the present disclosure.

FIG. 15 shows an example of a method 1500 for antenna tuning according to certain aspects of the present disclosure.

At block 1510, a radio frequency (RF) signal is magnetically coupled from a first inductor to a second inductor. For example, the transformer 420 may magnetically couple the RF signal from the first inductor (e.g., the first inductor 430) to the second inductor (e.g., the second inductor 440). The RF signal may come from a power amplifier (e.g., the PA 410) coupled to the first inductor.

At block 1520, an impedance of an antenna seen at the second inductor is tuned using an impedance matching circuit, the impedance matching circuit including a third inductor overlapping the first inductor and the second inductor, and one or more capacitors coupled to the third inductor. The impedance matching circuit may correspond to the impedance matching circuit 710. In certain aspects, tuning the impedance of the antenna includes tuning a capacitance of the one or more capacitor (e.g., the first capacitor 730 and/or the second capacitor 740). The tuning of the capacitance may be performed by the control circuit 810).

At block 1530, the RF signal is propagated from the impedance matching circuit to the antenna. For example, the transmission line 310 may propagate the RF to the antenna (e.g., the antenna 320).

In certain aspects, the third inductor includes a first loop and a second loop, and the method 1500 further includes generating magnetic flux within the first loop and magnetic flux within the second loop having opposite polarities. The first loop may correspond to the first loop 910 and the second loop may correspond to the second loop 915.

The control circuit 810 may be implemented with a general-purpose processor, a digital signal processor (DSP), an application specific integrated circuit (ASIC), a field programmable gate array (FPGA) or other programmable logic device, discrete hardware components (e.g., logic gates), or any combination thereof designed to perform the functions described herein. A processor may perform the functions described herein by executing software comprising code for performing the functions. The software may be stored on a computer-readable storage medium, such as a RAM, a ROM, an EEPROM, an optical disk, and/or a magnetic disk.

It is to be appreciated that an inductor may be physically implemented on a chip with multiple inductors coupled in series and/or parallel.

It is to be appreciated that the present disclosure is not limited to the exemplary terminology used above to describe aspects of the present disclosure. For example, an inductor of a transformer may also be referred to as a winding or another term. Also, it is to be appreciated that an inductor may be referred to as a coil even in cases where the inductor is not physically implemented with a coil. It is also to be appreciated that magnetic coupling may also be referred to as inductive coupling or another term. A tunable capacitor may also be referred to as a variable capacitor, a programmable capacitor, or another term. An impedance matching circuit may also be referred to as an impedance matching network, an impedance tuning circuit, an antenna tuner, or another term.

Implementation examples are described in the following numbered clauses:

1. An apparatus, comprising:
   a power amplifier;
   a first inductor coupled to the power amplifier;
   a second inductor magnetically coupled with the first inductor;
   an impedance matching circuit having a first terminal and a second terminal, wherein the first terminal is coupled to the second inductor, the second terminal is coupled to an antenna port, and the impedance matching circuit comprises:
      a third inductor coupled between the first terminal and the second terminal, wherein the third inductor overlaps the first inductor and the second inductor; and
      one or more capacitors coupled to the third inductor.

2. The apparatus of clause 1, wherein the third inductor includes an 8-shape conductor path forming a first loop and a second loop.

3. The apparatus of clause 2, wherein:
   the first inductor includes one or more loops; and
   the first loop and the second loop of the third inductor overlap an area within the one or more loops of the first inductor.

4. The apparatus of clause 2 or 3, wherein:
   the second inductor includes one or more loops; and
   the first loop and the second loop of the third inductor overlap an area within the one or more loops of the second inductor.

5. The apparatus of any one of clauses 2 to 4, wherein the third inductor is configured to generate magnetic flux within the first loop and magnetic flux within the second loop having opposite polarities.

6. The apparatus of any one of clauses 2 to 5, wherein the conductor path includes a first portion, a second portion, and a bridge, wherein the bridge couples the first portion and the second portion, and the bridge passes over the second portion.

7. The apparatus of clause 1, wherein the third inductor includes a first loop and a second loop.

8. The apparatus of clause 7, wherein:
   the first inductor includes one or more loops; and
   the first loop and the second loop of the third inductor overlap an area within the one or more loops of the first inductor.

9. The apparatus of clause 7 or 8, wherein:
the second inductor includes one or more loops; and
the first loop and the second loop of the third inductor overlap an area within the one or more loops of the second inductor.

10. The apparatus of any one of clauses 7 to 9, wherein the third inductor is configured to generate magnetic flux within the first loop and magnetic flux within the second loop having opposite polarities.

11. The apparatus of any one of clauses 1 to 10, wherein the one or more capacitors comprise a first capacitor having a first tunable capacitance, and a second capacitor having a second tunable capacitance.

12. The apparatus of clause 11, wherein the first tunable capacitance is digitally programmable, and the second tunable capacitance is digitally programmable.

13. The apparatus of any one of clauses 1 to 12, wherein the antenna port is coupled to an antenna.

14. The apparatus of clause 13, wherein the antenna is in an antenna array.

15. The apparatus of any one of clauses 1 to 14, wherein the second inductor is coupled between the first terminal of the impedance matching circuit and a ground.

16. The apparatus of any one of clauses 1 to 15, wherein the power amplifier has a first output and a second output, and the first inductor is coupled between the first output and the second output of the power amplifier.

17. The apparatus of any one of clauses 1 to 16, wherein the one or more capacitors comprise a first capacitor coupled to the first terminal, and a second capacitor coupled to the second terminal.

18. The apparatus of clause 17, wherein the first capacitor is coupled between the first terminal and a ground, and the second capacitor is coupled between the second terminal and the ground.

19. An apparatus, comprising:
a power amplifier;
a low-noise amplifier;
a first inductor coupled to the power amplifier;
a second inductor magnetically coupled with the first inductor;
a third inductor coupled to the low-noise amplifier, wherein the third inductor is magnetically coupled with the second inductor;
an impedance matching circuit having a first terminal and a second terminal, wherein the first terminal is coupled to the second inductor, the second terminal is coupled to an antenna port, and the impedance matching circuit comprises:
a fourth inductor coupled between the first terminal and the second terminal; and
one or more capacitors coupled to the fourth inductor.

20. The apparatus of clause 19, wherein the fourth inductor includes an 8-shape conductor path forming a first loop and a second loop.

21. The apparatus of clause 20, wherein:
the first inductor includes one or more loops; and
the first loop and the second loop of the fourth inductor overlap an area within the one or more loops of the first inductor.

22. The apparatus of clause 20 or 21, wherein:
the second inductor includes one or more loops; and
the first loop and the second loop of the fourth inductor overlap an area within the one or more loops of the second inductor.

23. The apparatus of any one of clauses 20 to 22, wherein:
the third inductor includes one or more loops; and
the first loop and the second loop of the fourth inductor overlap an area within the one or more loops of the third inductor.

24. The apparatus of any one of clauses 20 to 23, wherein the first loop and the second loop of the fourth inductor overlap the first inductor, the second inductor, and the third inductor.

25. The apparatus of any one of clauses 20 to 24, wherein the fourth inductor is configured to generate magnetic flux within the first loop and magnetic flux within the second loop having opposite polarities.

26. The apparatus of any one of clauses 20 to 25, wherein the conductor path includes a first portion, a second portion, and a bridge, wherein the bridge couples the first portion and the second portion, and the bridge passes over the second portion.

27. The apparatus of clause 19, wherein the fourth inductor includes a first loop and a second loop.

28. The apparatus of clause 27, wherein:
the first inductor includes one or more loops; and
the first loop and the second loop of the fourth inductor overlap an area within the one or more loops of the first inductor.

29. The apparatus of clause 27 or 28, wherein:
the second inductor includes one or more loops; and
the first loop and the second loop of the fourth inductor overlap an area within the one or more loops of the second inductor.

30. The apparatus of any one of clauses 27 to 29, wherein:
the third inductor includes one or more loops; and
the first loop and the second loop of the fourth inductor overlap an area within the one or more loops of the third inductor.

31. The apparatus of any one of clauses 27 to 30, wherein the first loop and the second loop of the fourth inductor overlap the first inductor, the second inductor, and the third inductor.

32. The apparatus of any one of clauses 27 to 31, wherein the fourth inductor is configured to generate magnetic flux within the first loop and magnetic flux within the second loop having opposite polarities.

33. The apparatus of any one of clauses 19 to 32, wherein the one or more capacitors comprise a first capacitor having a first tunable capacitance, and a second capacitor having a second tunable capacitance.

34. The apparatus of any one of clauses 19 to 33, wherein the antenna port is coupled to an antenna.

35. The apparatus of clause 34, wherein the antenna is in an antenna array.

36. The apparatus of any one of clauses 19 to 35, wherein the second inductor is coupled between the first terminal of the impedance matching circuit and a ground.

37. The apparatus of any one of clauses 19 to 36, wherein the third inductor is coupled between an input of the low-noise amplifier and a ground.

38. The apparatus of any one of clauses 19 to 37, wherein the power amplifier has a first output and a second output, and the first inductor is coupled between the first output and the second output of the power amplifier.

39. The apparatus of any one of clauses 19 to 38, wherein the one or more capacitors comprise a first capacitor coupled to the first terminal, and a second capacitor coupled to the second terminal.

40. The apparatus of clause 39, wherein the first capacitor is coupled between the first terminal and a ground, and the second capacitor is coupled between the second terminal and the ground.

41. A method for antenna tuning, comprising:
magnetically coupling a radio frequency (RF) signal from a first inductor to a second inductor;
tuning an impedance of an antenna seen at the second inductor using an impedance matching circuit coupled to the second inductor, the impedance matching circuit including a third inductor overlapping the first inductor and the second inductor, and one or more capacitors coupled to the third inductor; and
propagating the RF signal from the impedance matching circuit to the antenna.

42. The method of clause 41, wherein tuning the impedance of the antenna seen at the second inductor comprises tuning a capacitance of the one or more capacitors.

43. The method of clause 41 or 42, wherein the third inductor includes a first loop and a second loop, and the method further comprises generating magnetic flux within the first loop and magnetic flux within the second loop having opposite polarities.

44. The method of any one of clauses 41 to 43, within the first loop and the second loop of the third inductor overlap an area with one or more loops of the first inductor.

45. The method of any one of clauses 41 to 44, within the first loop and the second loop of the third inductor overlap an area with one or more loops of the second inductor.

46. An apparatus, comprising:
a power amplifier;
a first inductor coupled to the power amplifier;
a second inductor magnetically coupled with the first inductor;
an impedance matching circuit having a first terminal and a second terminal, wherein the first terminal is coupled to the second inductor, the second terminal is coupled to an antenna port, and the impedance matching circuit comprises:
a third inductor magnetically coupled to the first inductor and the second inductor and coupled between the first terminal and the second terminal; and
one or more capacitors coupled to the third inductor.

47. An apparatus for antenna tuning, comprising:
means for magnetically coupling a radio frequency (RF) signal from a first inductor to a second inductor;
means for tuning an impedance of an antenna seen at the second inductor, the means for tuning the antenna impedance including a third inductor overlapping the first inductor and the second inductor; and
means for propagating the RF signal from the means for tuning the antenna impedance to the antenna.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. Unless preceded by the term "magnetically", the term "coupled" is used herein to refer to the direct or indirect electrical coupling between two structures. It is also to be appreciated that the term "ground" may refer to a DC ground or an AC ground, and thus the term "ground" covers both possibilities. It is to be appreciated than an "input" may be a single-ended input, a differential input, or one of two inputs of a differential input, and an "output" may be a single-ended output, a differential output, or one of two outputs of a differential output. The term "approximately" means within 10 percent of the stated value (i.e., within a range of between 90 percent and 110 percent of the stated value).

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus, comprising:
a power amplifier;
a first inductor coupled to the power amplifier;
a second inductor magnetically coupled with the first inductor;
an impedance matching circuit having a first terminal and a second terminal, wherein the first terminal is coupled to the second inductor, the second terminal is coupled to an antenna port, and the impedance matching circuit comprises:
a third inductor coupled in series between the first terminal and the second terminal, wherein the third inductor overlaps the first inductor and the second inductor; and
one or more capacitors coupled to the third inductor.

2. The apparatus of claim 1, wherein the third inductor includes an 8-shape conductor path forming a first loop and a second loop.

3. The apparatus of claim 1, wherein the third inductor includes a first loop and a second loop.

4. The apparatus of claim 3, wherein:
the first inductor includes one or more loops; and
the first loop and the second loop of the third inductor overlap an area within the one or more loops of the first inductor.

5. The apparatus of claim 3, wherein:
the second inductor includes one or more loops; and
the first loop and the second loop of the third inductor overlap an area within the one or more loops of the second inductor.

6. The apparatus of claim 3, wherein the third inductor is configured to generate magnetic flux within the first loop and magnetic flux within the second loop having opposite polarities.

7. The apparatus of claim 1, wherein the one or more capacitors comprise a first capacitor having a first tunable capacitance, and a second capacitor having a second tunable capacitance.

8. The apparatus of claim 1, wherein the antenna port is coupled to an antenna.

9. The apparatus of claim 1, wherein the second inductor is coupled between the first terminal of the impedance matching circuit and a ground.

10. The apparatus of claim 1, wherein the power amplifier has a first output and a second output, and the first inductor is coupled between the first output and the second output of the power amplifier.

11. The apparatus of claim 1, wherein the one or more capacitors comprise a first capacitor coupled to the first terminal, and a second capacitor coupled to the second terminal.

12. The apparatus of claim 11, wherein the first capacitor is coupled between the first terminal and a ground, and the second capacitor is coupled between the second terminal and the ground.

13. A method for antenna tuning, comprising:
magnetically coupling a radio frequency (RF) signal from a first inductor to a second inductor;
tuning an impedance of an antenna seen at the second inductor using an impedance matching circuit coupled to the second inductor, the impedance matching circuit including a third inductor coupled in series between the second inductor and the antenna and overlapping the first inductor and the second inductor, and one or more capacitors coupled to the third inductor; and
propagating the RF signal through the third inductor of the impedance matching circuit to the antenna.

14. The method of claim 13, wherein tuning the impedance of the antenna seen at the second inductor comprises tuning a capacitance of the one or more capacitors.

15. The method of claim 13, wherein the third inductor includes a first loop and a second loop, and the method further comprises generating magnetic flux within the first loop and magnetic flux within the second loop having opposite polarities.

16. An apparatus, comprising:
a power amplifier;
a first inductor coupled to the power amplifier;
a second inductor magnetically coupled with the first inductor;
an impedance matching circuit having a first terminal and a second terminal, wherein the first terminal is coupled to the second inductor, the second terminal is coupled to an antenna port, and the impedance matching circuit comprises:
a third inductor magnetically coupled to the first inductor and the second inductor and coupled in series between the first terminal and the second terminal; and
one or more capacitors coupled to the third inductor.

\* \* \* \* \*